US011375438B2

(12) United States Patent
Sakoda et al.

(10) Patent No.: US 11,375,438 B2
(45) Date of Patent: *Jun. 28, 2022

(54) ADAPTIVE NETWORK DISCOVERY SIGNALING

(71) Applicant: SONY CORPORATION, Tokyo (JP)

(72) Inventors: Kazuyuki Sakoda, Campbell, CA (US); Ramy Abdallah, San Jose, CA (US); Mohamed Abouelseoud, San Francisco, CA (US)

(73) Assignee: SONY GROUP CORPORATION, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 16/897,185

(22) Filed: Jun. 9, 2020

(65) Prior Publication Data

US 2020/0374787 A1    Nov. 26, 2020

Related U.S. Application Data

(63) Continuation of application No. 15/944,188, filed on Apr. 3, 2018, now Pat. No. 10,716,053.

(Continued)

(51) Int. Cl.
*H04W 48/16* (2009.01)
*H04W 92/20* (2009.01)
(Continued)

(52) U.S. Cl.
CPC .......... *H04W 48/16* (2013.01); *H04B 7/0617* (2013.01); *H04L 5/0048* (2013.01);
(Continued)

(58) Field of Classification Search
CPC .... H04B 7/0695; H04B 7/088; H04B 7/0617; H04L 41/12; H04L 5/0053; H04L 5/0091;
(Continued)

(56) References Cited

U.S. PATENT DOCUMENTS 7,333,458 B2    2/2008   Cain
8,503,377 B2    8/2013   Cordeiro
(Continued)

FOREIGN PATENT DOCUMENTS

CN    102215061 A    10/2011
CN    102318392 A    1/2012
(Continued)

OTHER PUBLICATIONS

ISA/EPO, International Search Report and Written Opinion dated Dec. 17, 2018, related PCT international application No. PCT/IB2018/057374, pp. 1-15, claims searched, pp. 16-21.
(Continued)

*Primary Examiner* — Ajay Cattungal
(74) *Attorney, Agent, or Firm* — O'Banion & Ritchey LLP; John P. O'Banion

(57) ABSTRACT

An apparatus and method for adaptive network discovery signaling. Information is collected in a database of events, such as the discovery of a new station. The event information (e.g., new station, antenna sectors, active links) is shared with a central coordinator, or other stations in the network. Based on events, at this or other stations, signal transmission forms are adapted, for example for transmitting the beacon signals and notification signals. Adaptations of signal transmission include changing how frequently signaling is performed, timing of signaling, adjusting beam width, and/or adjusting directionality.

20 Claims, 29 Drawing Sheets

Related U.S. Application Data

(60) Provisional application No. 62/566,584, filed on Oct. 2, 2017.

(51) Int. Cl.

| | | |
|---|---|---|
| *H04L 5/00* | (2006.01) | |
| *H04W 28/16* | (2009.01) | |
| *H04W 8/00* | (2009.01) | |
| *H04B 7/06* | (2006.01) | |
| *H04L 41/12* | (2022.01) | |
| *H04W 72/04* | (2009.01) | |
| *H04W 84/14* | (2009.01) | |
| *H04B 7/08* | (2006.01) | |
| *H04W 76/14* | (2018.01) | |

(52) U.S. Cl.
CPC .......... *H04L 5/0053* (2013.01); *H04L 5/0091* (2013.01); *H04W 8/005* (2013.01); *H04W 28/16* (2013.01); *H04W 92/20* (2013.01); *H04B 7/0695* (2013.01); *H04B 7/088* (2013.01); *H04L 41/12* (2013.01); *H04W 72/046* (2013.01); *H04W 76/14* (2018.02); *H04W 84/14* (2013.01)

(58) Field of Classification Search
CPC .. H04L 5/0048; H04W 76/14; H04W 72/046; H04W 8/005; H04W 28/16; H04W 92/20; H04W 48/16
See application file for complete search history.

(56) References Cited

U.S. PATENT DOCUMENTS

| | | | |
|---|---|---|---|
| 8,755,302 | B2 | 6/2014 | Shao |
| 9,258,046 | B2 | 2/2016 | Sinha |
| 9,295,033 | B2 | 3/2016 | Quan |
| 10,742,299 | B2 | 8/2020 | Abouelseoud |
| 2006/0215624 | A1 | 9/2006 | Atul |
| 2007/0011435 | A1 | 1/2007 | Lee |
| 2008/0175197 | A1 | 7/2008 | Shao |
| 2010/0110981 | A1 | 5/2010 | Shao |
| 2010/0214169 | A1 | 8/2010 | Kafle |
| 2011/0069636 | A1 | 3/2011 | Shao |
| 2011/0199918 | A1 | 8/2011 | Sampath |
| 2011/0205969 | A1 | 8/2011 | Ahmad |
| 2011/0299422 | A1 | 12/2011 | Kim |
| 2012/0026941 | A1 | 2/2012 | Ahmad |
| 2012/0057580 | A1 | 3/2012 | Hansen |
| 2015/0131481 | A1 | 5/2015 | Lagrange |
| 2015/0189545 | A1 | 7/2015 | Morita |
| 2015/0201368 | A1 | 7/2015 | Cudak |
| 2015/0237548 | A1 | 8/2015 | Luo |
| 2015/0289147 | A1 | 10/2015 | Lou |
| 2015/0319700 | A1 | 11/2015 | Oteri |
| 2015/0351135 | A1 | 12/2015 | Schmidt |
| 2015/0365155 | A1 | 12/2015 | Subramanian |
| 2015/0373572 | A1 | 12/2015 | Sahin |
| 2015/0373618 | A1* | 12/2015 | Deenoo ................ H04B 7/0695 455/502 |
| 2015/0382171 | A1 | 12/2015 | Roy |
| 2016/0044711 | A1 | 2/2016 | Lou |
| 2016/0191132 | A1 | 6/2016 | Rajagopal |
| 2016/0192395 | A1 | 6/2016 | Yoo |
| 2016/0255660 | A1 | 9/2016 | Son |
| 2016/0269137 | A1 | 9/2016 | Lindoff |
| 2016/0380685 | A1 | 12/2016 | Kasher |
| 2017/0064583 | A1 | 3/2017 | Roy |
| 2017/0086211 | A1 | 3/2017 | Sahin |
| 2017/0180025 | A1 | 6/2017 | Cariou |
| 2017/0223587 | A1 | 8/2017 | Trainin |
| 2017/0223744 | A1 | 8/2017 | Chen |
| 2017/0346525 | A1 | 11/2017 | Stirling-Gallacher |
| 2018/0098366 | A1 | 4/2018 | Cohn |
| 2018/0115994 | A1 | 4/2018 | Islam |
| 2018/0123660 | A1 | 5/2018 | Jung |
| 2018/0199324 | A1 | 7/2018 | Sun |
| 2018/0206139 | A1 | 7/2018 | Wang |
| 2018/0331914 | A1 | 11/2018 | Yoshida |
| 2018/0343605 | A1* | 11/2018 | Wu ................ H04W 72/046 |
| 2019/0007822 | A1 | 1/2019 | Wee |
| 2019/0045520 | A1 | 2/2019 | Venkatachalam Jayaraman |
| 2019/0075607 | A1 | 3/2019 | Park |
| 2019/0104546 | A1* | 4/2019 | Chendamarai Kannan ................. H04B 7/0695 |
| 2019/0208540 | A1* | 7/2019 | Kim ................ H04W 74/0816 |

FOREIGN PATENT DOCUMENTS

| | | |
|---|---|---|
| CN | 103348757 A | 10/2013 |
| CN | 104982049 A | 10/2015 |
| CN | 105052235 A | 11/2015 |
| CN | 105722051 A | 6/2016 |
| CN | 105981310 A | 9/2016 |
| CN | 107949057 A | 4/2018 |
| EP | 2104245 A1 | 9/2009 |
| EP | 3046378 | 7/2016 |
| JP | 2012503944 A | 2/2012 |
| JP | 2012199680 A | 10/2012 |
| JP | 2013520937 A | 6/2013 |
| JP | 2014520445 A | 8/2014 |
| JP | 2016511585 A | 4/2016 |
| JP | 2017188836 A | 10/2017 |
| KR | 20080088572 A | 10/2008 |
| KR | 20120100895 A | 9/2012 |
| KR | 20150117288 A | 10/2015 |
| WO | 2014124048 | 8/2014 |
| WO | 2015138914 | 9/2015 |
| WO | 2016065068 | 4/2016 |
| WO | 2016086144 | 6/2016 |
| WO | 2016126338 A1 | 8/2016 |
| WO | 2016210302 | 12/2016 |
| WO | 2017063496 | 4/2017 |
| WO | 2017095613 | 6/2017 |

OTHER PUBLICATIONS

Astudillo, Gabriel et al., "Neighbor discovery and routing schemes for mobile ad-hoc networks with bandwidth adaptive smart antennas", Telecommun Syst (2017) 66:17-27, published online Jan. 10, 2017.

China Patent Office, Official Action dated Oct. 11, 2021, related Chinese patent application No. 201880081476.9, pp. 1-10, English-language translation, pp. 11-20, claims, pp. 21-26.

ISA/EP, European Patent Office (EPO), International Search Report and Written opinion dated Dec. 3, 2019, releated PCT international application No. PCT/IB2019/056730, pp. 1-13, claims searched, pp. 14-19.

Park, Hyunhee et al., "Multi-band Directional Neighbor Discovery in Self-Organized mmWave ad-hoc Networks", IEEE Transactions on Vehicular Technology, vol. 64, Issue 3, Mar. 2015, published Jun. 5, 2014, pp. 1143-1155.

Deng, Junquan et al., Resource Allocation and Interference Management for Opportunistic Relaying in Integrated mmWave/sub-6GHz 5G Networks, IEEE Communications Magazine, vol. 55, Issue 6, Jun. 12, 2017, pp. 94-101.

ISA/EP, European Patent Office (EPO), International Search Report and Written Opinion dated Apr. 5, 2019, related PCT international application No. PCT/IB2018/060465, pp. 1-17, claims searched, pp. 18-23.

ISA/EP, European Patent Office (EPO), International Search Report and Written Opinion dated Nov. 23, 2018, related PCT international application No. PCT/IB2018/056562, pp. 1-20, claims searched, pp. 21-27.

Taiwan Patent Office, Official Action dated May 17, 2019, related Taiwan patent application No. 107130827, pp. 1-11, English-language translation, pp. 12-21, claims examined, pp. 22-18.

Shokri-Ghadikolaei, Hossein et al., "Millimeter Wave Ad Hoc Networks: Noise-limited or Interference-limited?", 2015 IEEE Globecom Workshops (GCW kshps), Feb. 25, 2016, pp. 1-7.

(56) References Cited

OTHER PUBLICATIONS

Zou Ning, "Information Technology and Standardization", Issue 03, IEEE 802 11ad Standard and Application, Mar. 10, 2013, pp. 1-13.
Wang, Liang-min et al., "Overview of Internet of vehicles for 5G", Chinese Journal of Network and Information Security, Issue 06, Jun. 2016, pp. 1-21.
China National Intellectual Property Administration (CNIPA), Notification of the First Office Action dated Jan. 29, 2022, English-language translation, related Chinese Patent Application No. 201880056135.6, pp. 1-9.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|

Octets: 2    2    6    6    3    3    4

**FIG. 7
(Prior Art)**

| B0 | B1    B9 | B10    B15 | B16    B17 | B18    B23 |
|---|---|---|---|---|
| Direction | CDOWN | Sector ID | DMG Antenna ID | RXSS Length |

Bits: 1    9    6    2    6

**FIG. 8
(Prior Art)**

| B0    B8 | B9    B10 | B11    B15 | B16 | B17    B23 |
|---|---|---|---|---|
| Total sectors in ISS | Number of RX DMG antennas | Reserved | Poll Required | Reserved |

Bits: 9    2    5    1    7

**FIG. 9A
(Prior Art)**

| B0    B5 | B6    B7 | B8    B15 | B16 | B17    B23 |
|---|---|---|---|---|
| Sector select | DMG Antenna select | SNR report | Poll Required | Reserved |

Bits: 6    2    8    1    7

**FIG. 9B
(Prior Art)**

ADAPTIVE NETWORK DISCOVERY SIGNALING

CROSS-REFERENCE TO RELATED APPLICATIONS

This application is a continuation of U.S. patent application Ser. No. 15/944,188 filed on Apr. 3, 2018, incorporated herein by reference in its entirety, which application claims priority to, and the benefit of, U.S. provisional patent application Ser. No. 62/566,584 filed on Oct. 2, 2017, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless networks, and more particularly to adaptive network discovery signaling.

2. Background Discussion

Existing sub-6 GHz wireless technology is not sufficient to cope with the high demand for data in wireless networks. One easy alternative is utilizing more spectrum in the 30-300 GHz band which is referred to as the millimeter wave band (mmW), which are becoming increasingly important.

Enabling mmW wireless systems in general requires properly dealing with the channel impairments and propagation characteristics of the high frequency bands. High free-space path loss, high penetration, reflection and diffraction losses reduce the available diversity and limit non-line-of-sight (NLOS) communications.

The small wavelength of mmW enables the use of high-gain electronically steerable directional antennas of practical dimensions. This technology can provide enough array gain to overcome path loss and ensure high Signal-to-Noise Ratio (SNR) at the receiver. Using directional mesh networks in dense deployment environments and the mmW band provides an efficient way to achieve reliable communications between nodes and overcome line-of-sight channel restrictions.

A new communication node (station) starting up in an area will be searching for neighboring nodes to discover and a network to join. The process of initial access from a new node to a network comprises scanning for neighboring nodes and discovering all active local nodes. This can be performed either through the new node searching for a specific network/list of networks to join or the new node sending a broadcast request to join any already established network that will accept the new node.

A node connecting to a mesh network needs to discover all neighboring nodes to decide on the best way to reach a gateway/portal mesh node and the capabilities of each of these neighboring nodes. The new node examines every channel for possible neighboring nodes for a specific period of time. If no active node is detected after that specific time, the node moves to the next channel.

When a node is detected, the new node needs to collect sufficient available information to configure itself (its PHY layer) for operation in the regulatory domain. This task is further challenging in mmWave communications due to directional transmissions. The challenges in this process can be summarized as: (a) knowledge of surrounding node IDs; (b) knowledge of best transmission pattern for beamforming; (c) maintaining the whole network in synchronization over the entire period of time; (d) channel access issues due to collisions and deafness; and (e) channel impairments due to blockage and reflections.

Thus, improved neighborhood discovery methods are sought to overcome some or all of the above issues to enable pervasiveness of mmWave device-to-device (D2D) and mesh technologies. However, existing technologies for mesh networking address mesh discovery solutions for networks operating in broadcast mode, but are not directed for use on networks having directional wireless communications.

Accordingly, a need exists for enhanced network discovery signaling within directional (mmW) wireless communication networks. The present disclosure fulfills that need and provides additional benefits over previous technologies.

BRIEF SUMMARY

Wireless communication apparatus and method using directional transmissions and signaling to enhance network discovery. The stations may perform network discovery in a distributed mode and/or a central coordinator mode, by exchanging information on new stations between themselves and/or with a central coordinator. The type of signal transmission to be performed is determined, and then transmitted, by the individual station or a central coordinator. Network stations adapt signal transmission (e.g., frequency, beam width and/or timing) to aid in scanning the network as indicated in the received information.

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an Omni-directional antenna pattern or quasi-omni directional antenna pattern. Beamforming is used at a transmitter to improve received signal power or signal-to-noise ratio (SNR) at an intended receiver.

BI: The Beacon Interval is a cyclic super frame period that represents the time between beacon transmission times.

BSS: Basic Service Set; a set of stations (STAs) that have successfully synchronized with an AP in the network.

BSSID: Basic Service Set Identification.

BHI: Beacon Header Interval which contains a beacon transmission interval (BTI) and association-beamforming training period (A-BFT).

BI: Beacon Interval, is a cyclic super-frame period that represents the time between transmission times.

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

MAC address: a Medium Access Control (MAC) address.

MBSS: Mesh basic service set, A basic service set (BSS) that forms a self-contained network of Mesh Stations (MSTAs), and which may be used as a distribution system (DS).

MCS: Modulation and coding scheme; an index that can be translated into the PHY layer data rate.

MSTA: Mesh station (MSTA): A station (STA) that implements the Mesh facility. An MSTA that operates in the Mesh BSS may provide the distribution services for other MSTAs.

Omni-directional: a non-directional antenna mode of transmission.

Quasi-Omni directional: a directional multi-gigabit (DMG) antenna operating mode with the widest beamwidth attainable.

RSSI: Receive Signal Strength Indicator (in dBm).

Receive sector sweep (RXSS): Reception of Sector Sweep (SSW) frames via different sectors, in which a sweep is performed between consecutive receptions.

SLS: Sector-level Sweep phase: a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period; The SP that is scheduled by the access point (AP). Scheduled SPs start at fixed intervals of time.

Spectral efficiency: The information rate that can be transmitted over a given bandwidth in a specific communication system, usually expressed in bits/sec/Hz.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a mesh configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

DETAILED DESCRIPTION

1. Existing Directional Wireless Network Technology 1.1. WLAN Systems

In WLAN systems, 802.11 defines two modes of scanning; passive and active scanning. The following are the characteristics of passive scanning. (a) A new station (STA), attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) STA moves to a channel, waits for incoming frames or a probe delay timer to expire. (a)(2) If no frame is detected after the timer expires, the channel is considered to be not in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (more rapid) for STAs to gain access to the network compared to the use of passive scanning, since STAs do not need to wait for beacons. (f) In infrastructure basic service set (BSS) and IBSS, at least one STA is awake to receive and respond to probes. (g) STAs in mesh basic service set (MBSS) might not be awake at any point of time to respond. (h) When radio measurement campaigns are active, nodes might not answer the probe requests. (i) Collision of probe responses can arise. STAs might coordinate the transmission of probe responses by allowing the STA that transmitted the last beacon to transmit the first Probe Response. Other nodes can follow and use back-off times and regular distributed coordination function (DCF) channel access to avoid collision.

Figure 1:
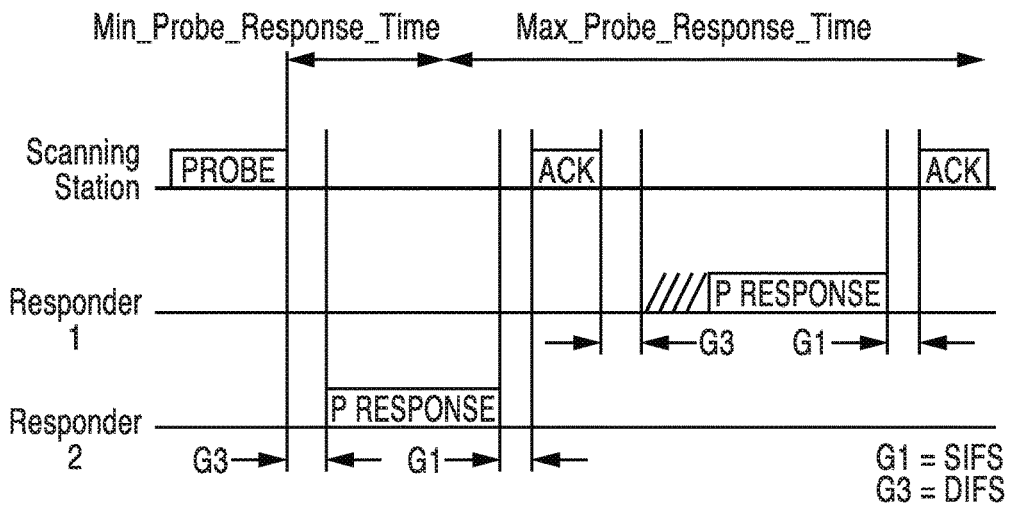
FIG. 1 is a timing diagram of active scanning performed in an IEEE 802.11 wireless local area network (WLAN).

FIG. 1 depicts the use of active scanning in an IEEE 802.11 WLAN, depicting a scanning station sending a probe and two responding stations which receive and respond to the probe. The figure also shows the minimum and maximum probe response timing. The values G1 is shown set to SIFS which is the interframe spacing prior to transmission of an acknowledgment, while G3 is DIFS which is DCF interframe spacing, represented the time delay for which a sender waits after completing a backoff period before sending an RTS package.

1.2. IEEE 802.11s Mesh WLAN

The IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
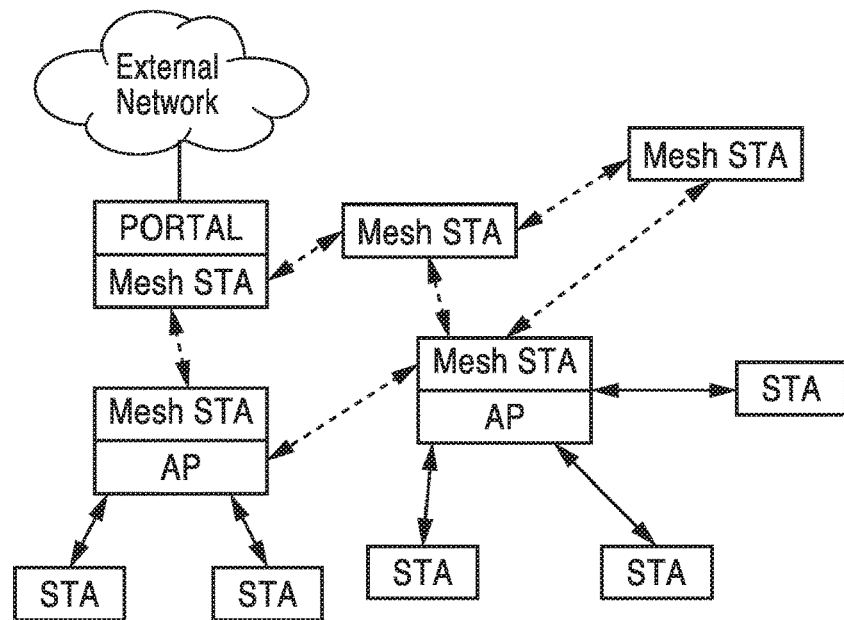
FIG. 2 is a node diagram for a mesh network showing a combination of mesh and non-mesh stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
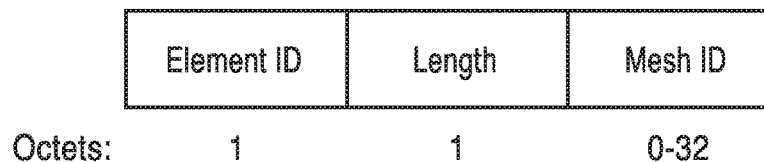
FIG. 3 is a data field diagram depicting a mesh identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example, it is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The standard 802.11a defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmit Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing node (the responder) receives utilizing a quasi-Omni directional pattern. The responder determines the antenna array sector from the initiator which provided the best link quality (e.g., SNR).

Figure 5:
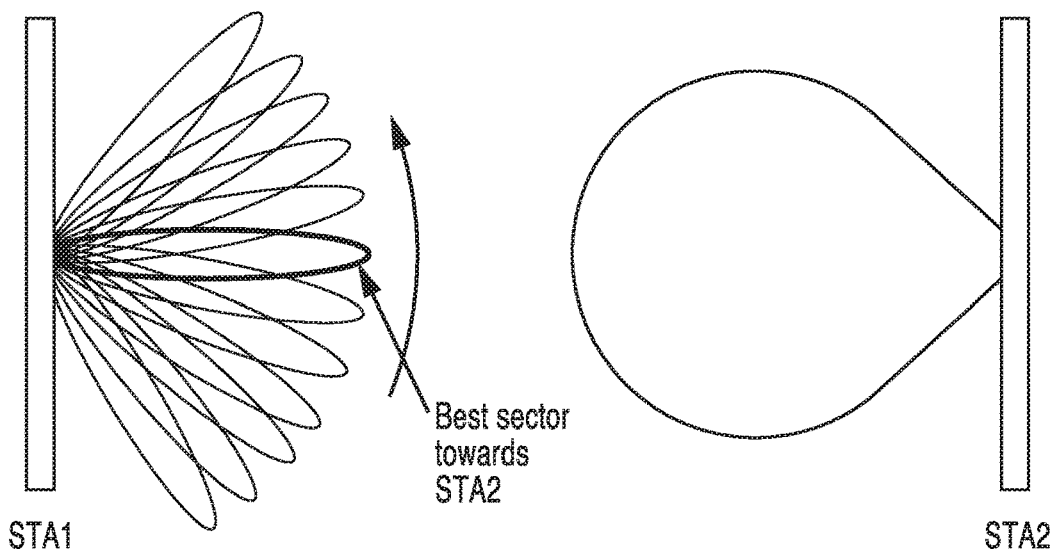
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
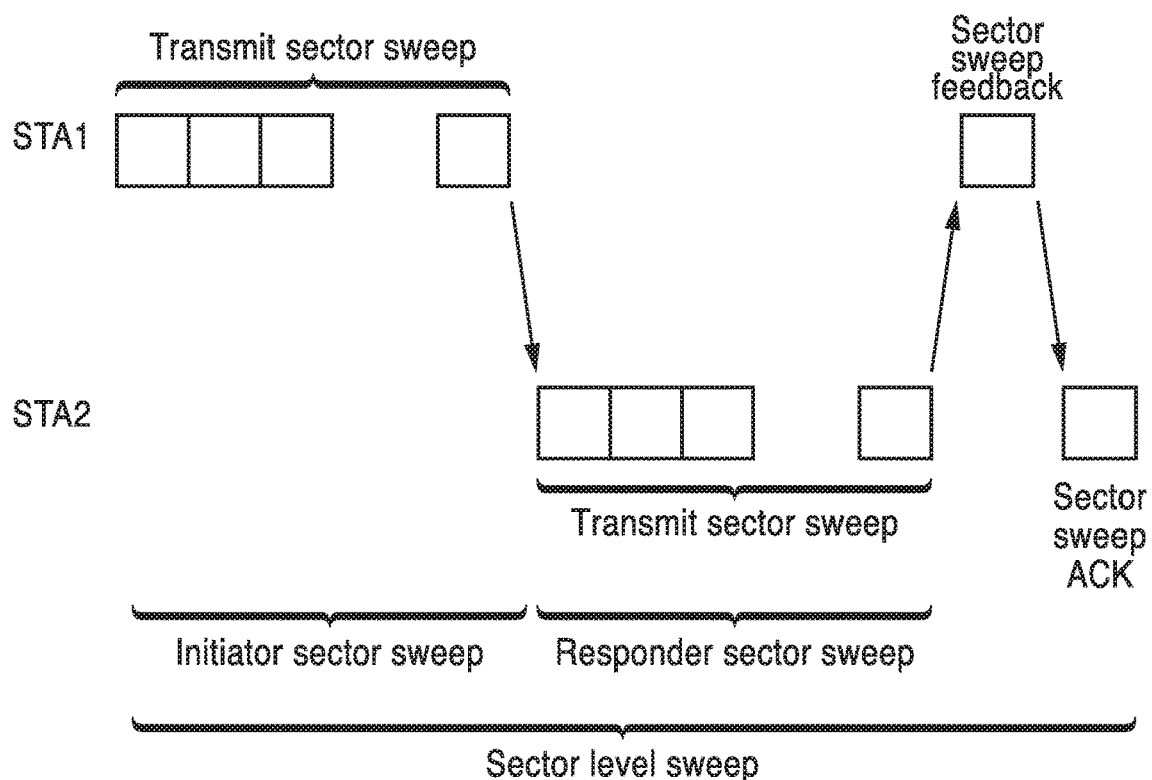
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Introduction to Adaptive Network Discovery Signaling

2.1. Problem Statement

Millimeter-wave (mmW) communications system heavily rely on directional communications to gain sufficient link budget between transmitter and receiver. As seen in the problems encountered by prior art communication systems, determination of a proper beam for use requires significant signaling overhead. AP transmits multiple beacon frames with transmit beam forming.

The beacon frames are used for network discovery purposes, i.e., passive scanning. For this reason, beacon frames are transmitted periodically, so that a new STA can recognize the existence of the network by performing passive scanning in a certain time period.

The current technology trend is toward the use of finer beam forming, which allows higher antenna gain to secure better link budgets. However, when the STA employs finer beams, STAs need to transmit even more beacon frames to cover enough angle of transmission.

There is a trade-off between beaconing overhead versus network discovery delay. If beacons are transmitted frequently, then beaconing overhead increases although a new STA can find an existing network rapidly. If beacons are transmitted less frequently, then beaconing overhead can be decreased, yet it becomes more difficult and slow for a new STA to find an existing network.

The dilemma becomes more problematic when considering forming a mesh network utilizing mmW PHY technology. A STA connecting to a mesh network will need to discover all neighboring STAs to decide on the best way to reach a gateway/portal mesh STAs and the capabilities of each of these neighboring STAs. Accordingly, all the STAs joining a mesh network should have a capability of beaconing which leads to significant signaling overhead.

2.2. Contribution of Present Disclosure

By utilizing the disclosed technology, STAs employing mmW PHY can form a mesh topology network without suffering significant signaling overhead, or creating network discovery delays.

The proposed technology adopts beaconing behavior based on the information collected through the STAs. The STAs change important aspects of the physical transmission, based on the events that the STAs experienced or information fed from the user. In particular, the example embodiments describes changing transmission aspects including frequency, beam width, and/or directionality of the beacon signals.

The proposed technology defines a set of rules which allow both passive scanning and active scanning with reduced beaconing overhead. Based on these rules, new STAs can discover an existing network with limited network delay.

3. Embodiments of Present Disclosure

3.1. Station Hardware Configuration

Figure 10:
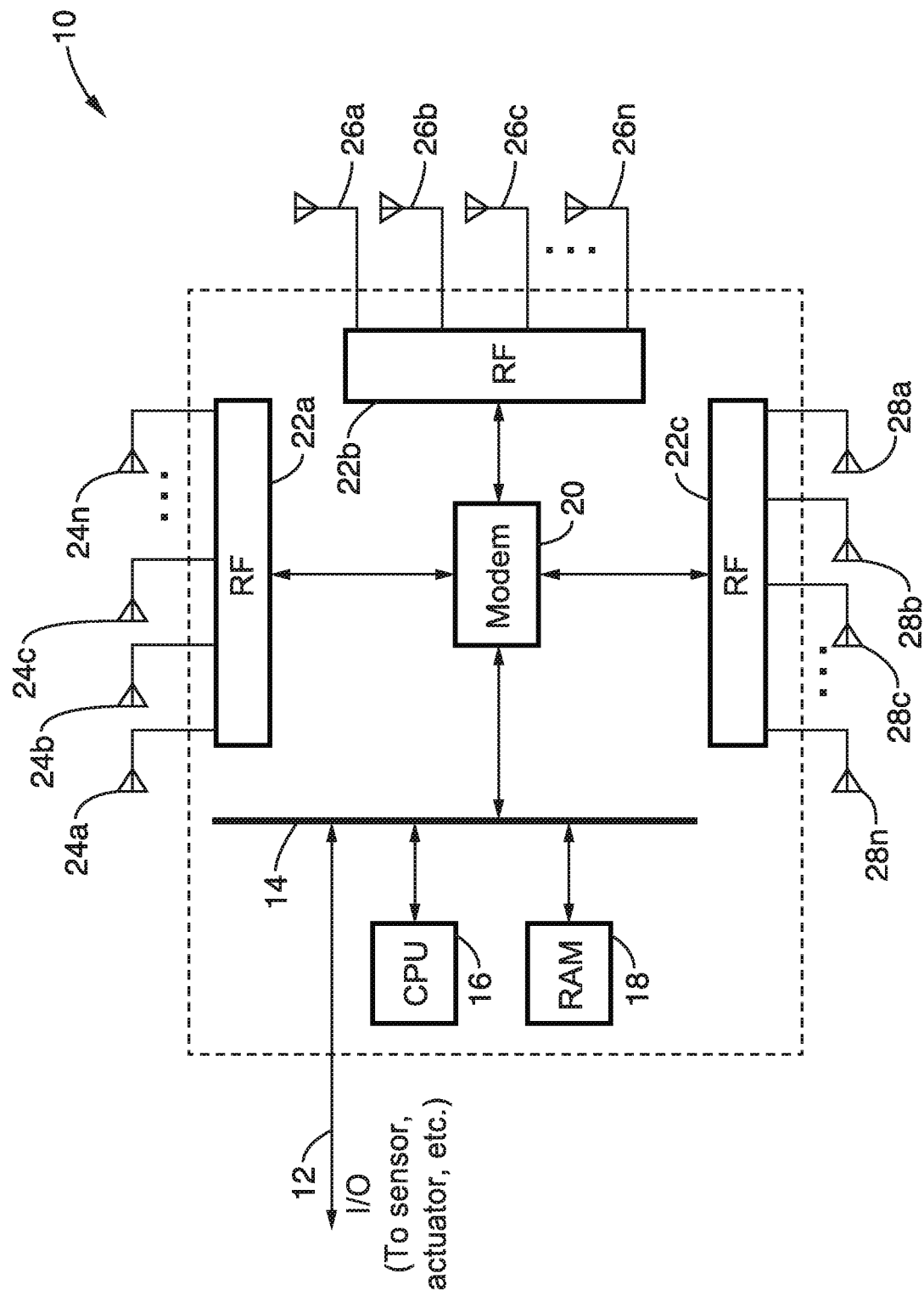
FIG. 10 is a block diagram of station hardware according to an embodiment of the present disclosure.

FIG. 10 illustrates an example embodiment 10 of the hardware configuration for a node (wireless station in the network). In this example a computer processor (CPU) 16 and memory (RAM) 18 are coupled to a bus 14, which is coupled to an I/O path 12 giving the node external I/O, such as to sensors, actuators and so forth. Instructions from memory are executed on processor 16 to execute a program which implements the communication protocols of the station (node). The station host machine is shown configured with a mmW modem 20 coupled to radio-frequency (RF) circuitry 22a, 22b, 22c to a plurality of antennas 24a, 24b, 24c through 24n, 26a, 26b, 26c through 26n, and 28a, 28b, 28c through 28n to transmit and receive frames with neighboring nodes.

By way of example and not limitation, the hardware circuitry is shown only providing the mmW directional communication circuits. However, it should be appreciated that some stations will also provide multi-band communications, such as incorporating an omni-directional communications system. By way of example and not limitation, stations may incorporate a sub-6 GHz communication circuit comprising a modem coupled to radio-frequency (RF) circuitry to one or more antenna(s).

Figure 11:
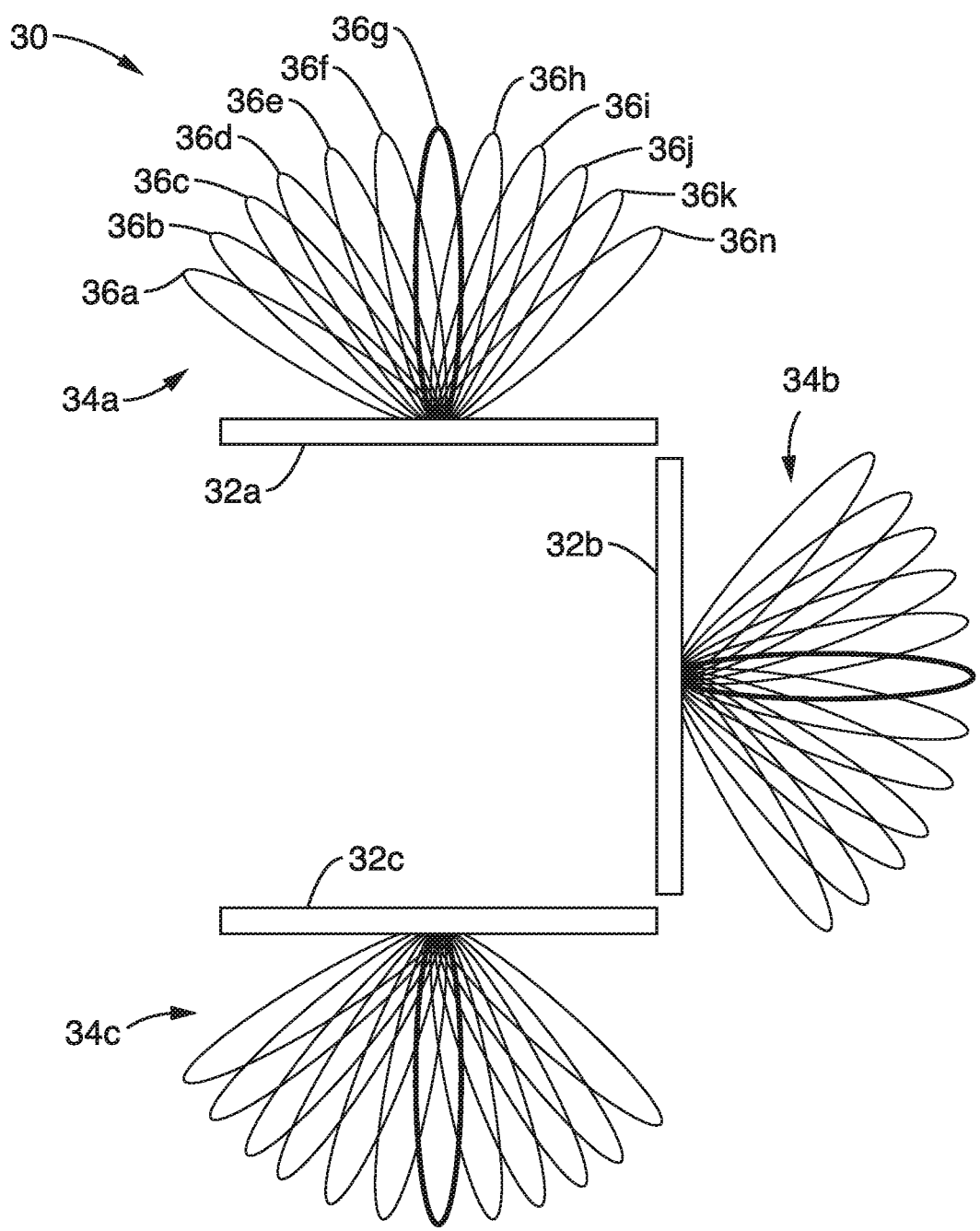
FIG. 11 is a beam pattern diagram generated by a mmW antenna system according to an embodiment of the present disclosure.

FIG. 11 illustrates an example embodiment 30 of mmWave antenna directions which can be utilized by a node to generate a plurality (e.g., 36) of mmWave antenna sector patterns. In this example, the node implements three RF circuits 32a, 32b, 32c and connected antennas, and each RF circuit and connected antenna generate a beamforming pattern 34a, 34b, 34c. Antenna pattern 34a is shown having twelve beamforming patterns 36a, 36b, 36c, 36d, 36e, 36f, 36g, 36h, 36i, 36j, 36k and 36n ("n" representing that any number of patterns can be supported). The example station using this specific configuration has thirty six (36) antenna sectors. However, for the sake of clarity and ease of explanation, the following sections generally describe nodes having a smaller number of antenna sectors. It should be appreciated that a station may be configured with any arbitrary number of antenna sectors, with any desired beam pattern mapped to an antenna sector. Typically, the beam pattern is formed to generate a sharp beam, but it is possible that the beam pattern is generated to transmit or receive signals from multiple angles.

Antenna sector is determined by selection through mmWave RF circuitry with beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the node determines it is unnecessary to communicate with neighbor nodes.

In at least one embodiment, the RF circuitry includes frequency converter, array antenna controller, and so forth, and is connected to multiple antennas which are controlled to perform beamforming for transmission and reception. In this way the node can transmit signals using multiple sets of beam patterns, each beam pattern direction being considered as an antenna sector.

Although in this example three RF circuitries are depicted as coupled to the mmW modem, it will be appreciated that an arbitrary number of RF circuitries can be coupled to the mmW modem. In general, larger numbers of RF circuitry will result in broader coverage of the antenna beam direction. The number of RF circuitries and number of antennas utilized is determined by hardware constraints of a specific device, and the application to which it is directed. Some of the RF circuitry and antennas may be disabled when the node determines it is unnecessary to communicate with neighbor nodes.

Figure 12A:
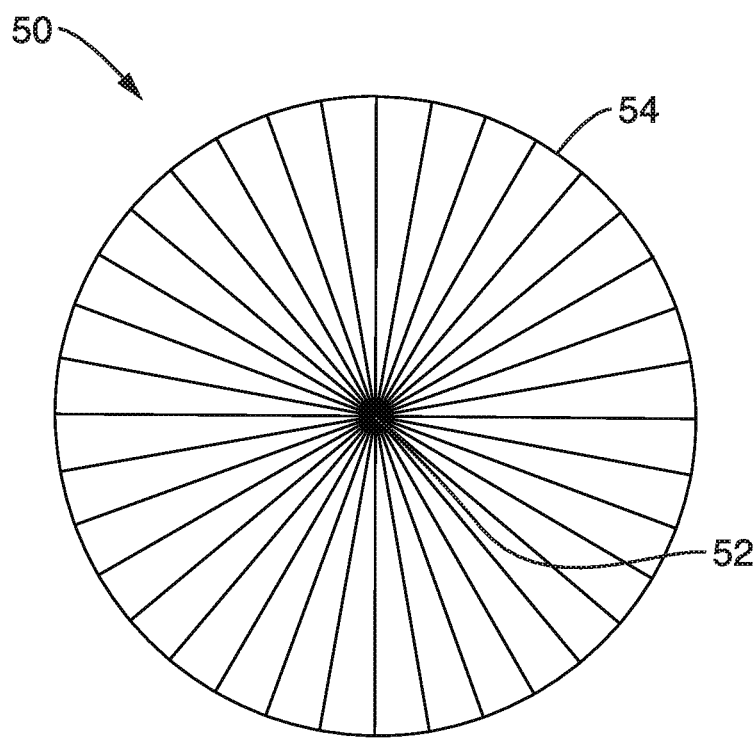
FIG. 12A and FIG. 12B is a beam pattern diagram of beam pattern adaptation as utilized according to an embodiment of the present disclosure.
Figure 12B:
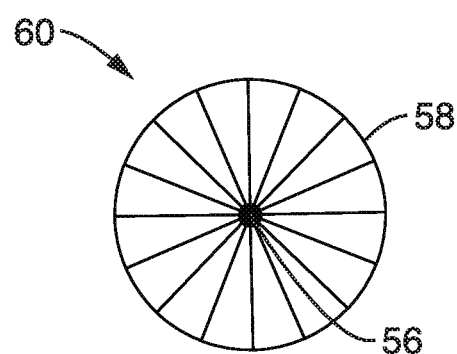

FIG. 12A and FIG. 12B illustrate an example embodiment 50, 60, of a STA of the present disclosure adapting its transmission and reception beam patterns to suit the prevailing conditions. In this example of adaptation, the STA is shown to form either sharper beams as in FIG. 12A, or wider beams as in FIG. 12B, by changing setting to the RF circuitry. If the STA uses sharp beams, the beam width is limited yet provides increased antenna gain. FIG. 12A illustrates an STA 52 using sharp beams 50, each of which 54, has a narrow angular spread, while providing increased range in that narrow spread. By way of example 50, this sharp beam selection is depicted to provide 36 sectors in covering a full 360 degrees. This is contrasted to example 60 in FIG. 12B showing a STA 56 adapting its communication by selecting the use of wider beams, each beam 58 covers a larger field of view while it provides less antenna gain than the pattern shown in FIG. 12A, wherein the length of each of these beam segments is shown being less that the narrower beam segments seen in FIG. 12A, depicting by way of example the use of 16 beam sectors to cover 360 degrees.

3.2. Network Topology for Consideration

Figure 13:
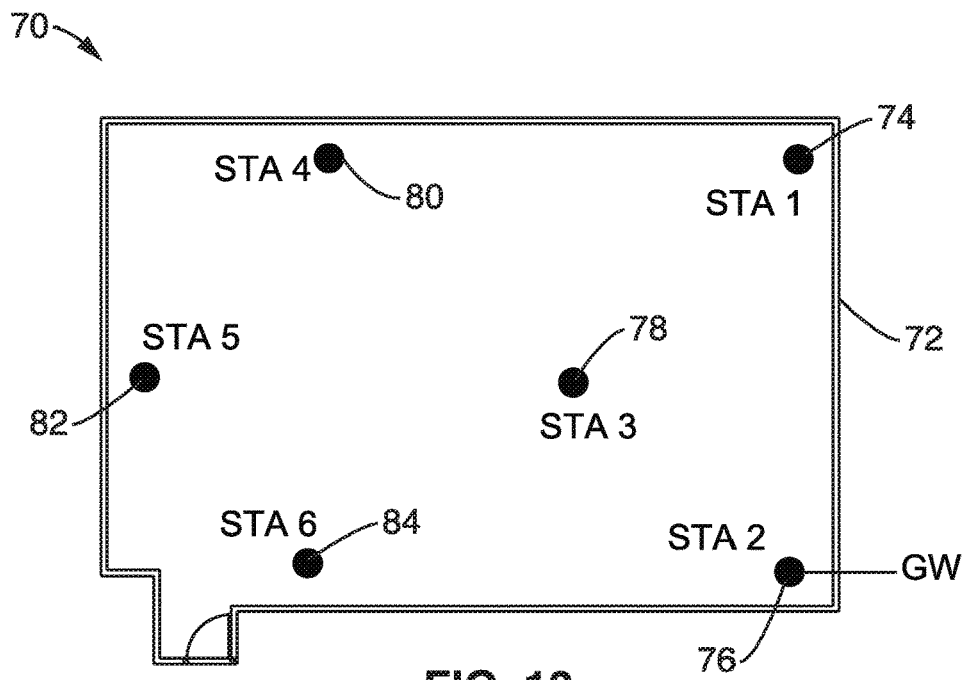
FIG. 13 is a wireless node topology example of wireless mmWave nodes in a wireless network as utilized according to an embodiment of the present disclosure.

FIG. 13 illustrates an example embodiment 70 of an example topology for consideration, shown as being within a building structure 72 (e.g., meeting room), within which multiple stations may operate, exemplified here as STA-1 74, STA-2 76, STA-3 78, STA-4 80, STA-5 82, STA-6 84. A network scenario is adopted using the above example topology to better explain the goals and operation of the proposed technology. In the example each of the six STAs can communicate with neighbor STAs over 60 GHz PHY, with all STAs using directional antennas with beamforming capability. Mobile STAs may be coming into or leaving the room. STA-2 76 is connected to a gateway (GW), where traffic is carried to external networks. All STAs form a network and wait to welcome any new STAs. When a new STA shows up, it shall become a member of the network and connects to the gateway as soon as possible.

Figure 14:
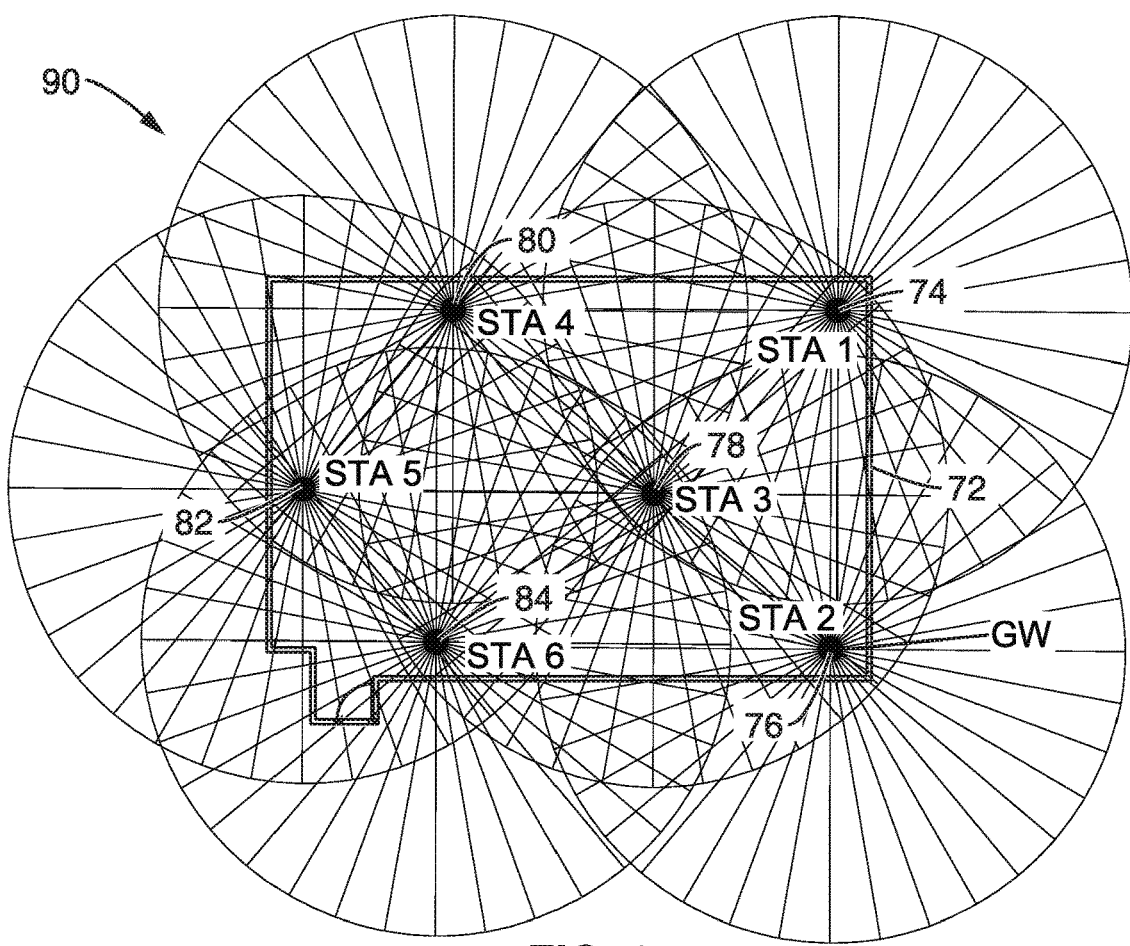
FIG. 14 is the wireless node topology of FIG. 13, showing wireless mmWave nodes performing typical beacon transmission using fine beams.

FIG. 14 illustrates an example of a conventional beacon frame sending patterns 90 of STAs (STA-1 74, STA-2 76, STA-3 78, STA-4 80, STA-5 82, and STA-6 84) within the walled topology of FIG. 13. If STA-1 through STA-6 are sending beacon frames as the AP does, then STA-1 through STA-6 perform sector sweeping of beacon frames using a fine beam. A newly joining STA can find the network by scanning beacon frames.

However, as can be seen from the dramatic beam overlapping and signal levels directed at the walls in the figure, this process results in far too many beacon frame transmissions, which will obviously incur not only significant overhead, but also create interference that reduces overall network performance.

Figure 15:
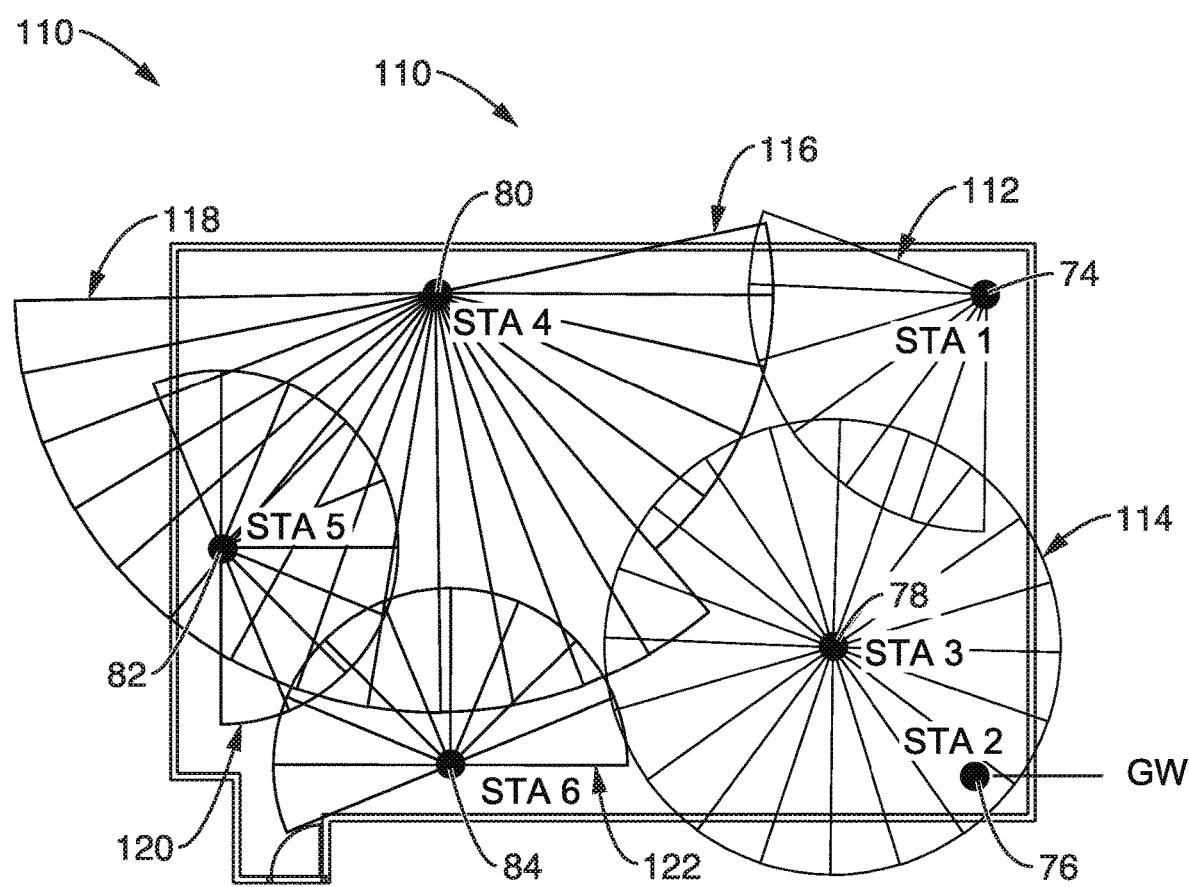
FIG. 15 is the wireless node topology of FIG. 13, showing wireless mmWave nodes performing adaptive beacon transmission according to an embodiment of the present disclosure.

FIG. 15 illustrates an example embodiment 110 of selected sector sweeping according to the present disclosure for the STAs (STA-1 74, STA-2 76, STA-3 78, STA-4 80, STA-5 82, and STA-6 84). To remove this overhead and unnecessary signal transmission, the present disclosure is directed to the object of adapting transmissions to provide adequate coverage while reducing overhead and interference. For example the transmission of beacon frames is adapted toward obtaining reasonable coverage and beacon frequency, depending on location of the STA and topology of the network. One goal of the proposed technology is to enable efficient beaconing with adaptation, as seen in the beacon patterns of this figure.

In particular, STA-1 74 is seen transmitting 112 wide beams spanning just over a 90 degree spread based on its position in the walled structure and the location of the other STAs. STA-2 76 is seen as the gateway (GW). STA-3 78 is seen transmitting 114 wide beams spanning a full 360 degrees to provide a slight overlap with the patterns of the other stations. STA-4 80 is seen transmitting a sweep 116 of wide beams spanning, and a sweep of narrow beams 118. STA-5 82 is seen transmitting 120 wide beams, while STA-6 84 similarly transmits 122 wide beams. These adaptations will be discussed in greater detail in later sections.

3.3. Overall Flow of Beacon Adaptation

Beacon adaptation is triggered by events detected by the STAs in the network. STAs are periodically (regularly) monitoring the status of the events and record the events inside the database they maintain within the STA. Examples of the event that a STA records which potentially triggers actions are follows: (a) detection of a new STA which shows up in the vicinity of the network; (b) establishment and release of the mutual link for communication; (c) newly started traffic or the end of active traffic over a link; (d) detection of management signals transmitted from neighboring STA; (e) timer expiration; and (f) command from a user.

Upon an event occurring during network operations, each STA records the event in its database and shares the event data to one or more external entities. Then, depending on the decision making logic utilized in the specific application, each STA is configured for changing its transmission form for these management signals, such as beacon signals.

Upon changing the form of a signal transmission, the STAs exchange a notification signal about the change signal form. By repeating these transactions, the form of the beacon signals in the local network will adapt so that unnecessary signals are mitigated.

After event detection by STAs, the system starts a signal adaptation procedure. By way of example and not limitation, the following describes two general types of procedures: Case 1 with a distributed management procedure, and Case 2 with a centralized management procedure.

3.3.1. Distributed Management (Case 1)

Figure 16A:
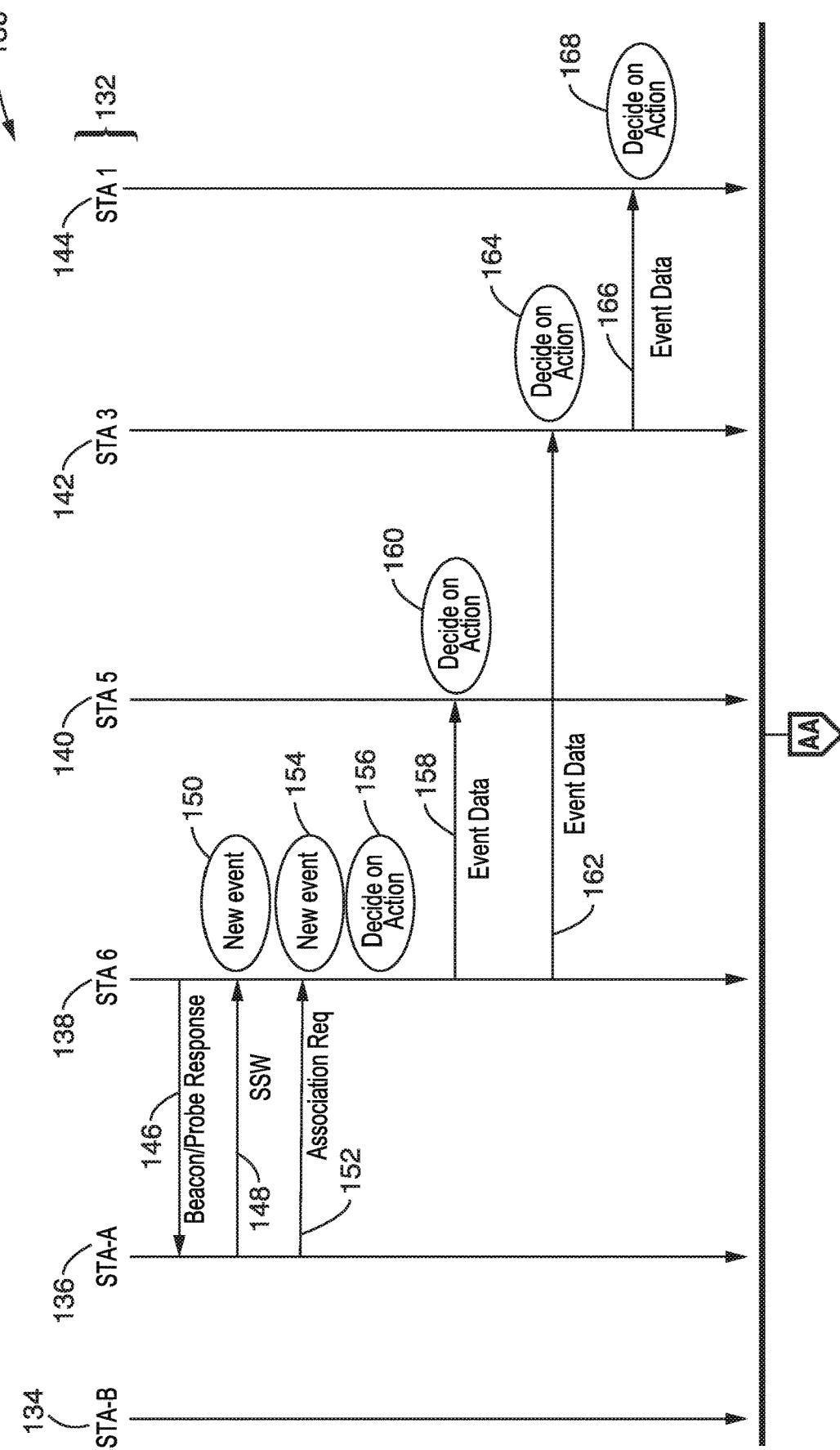
FIG. 16A and FIG. 16B is an information exchange sequence among stations using distributed management of adaptive beacon transmission according to an embodiment of the present disclosure.
Figure 16B:
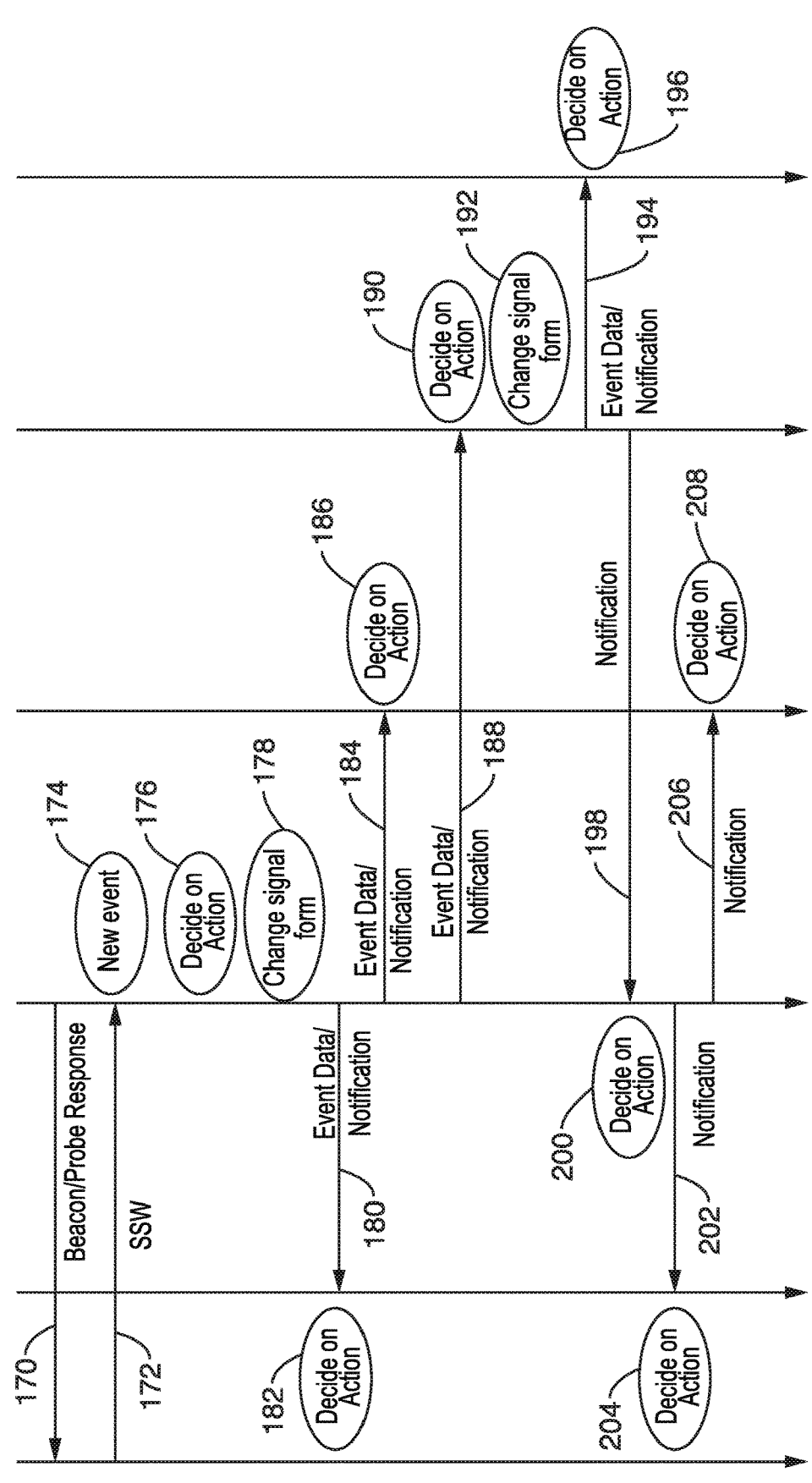

FIG. 16A and FIG. 16B illustrates an example embodiment 130 of overall information exchange among STAs according to a distributed management case according to the present disclosure. In the figure are seen multiple stations 132 in the network, which in this case are depicted as STA-B 134, STA-A 136, STA-6 138, STA-5 140, STA-3 142 and STA-1 144. In this section, overall signal flow among STAs are explained. In this example detection of a new STA is the trigger event. It is possible that other types of events can trigger the overall process as explained below.

With a distributed management procedure, STAs will make autonomous decisions exchanging events that each STA detected and actions that each STAs made. STA-1, STA-3, STA-5, and STA-6 are STAs which were depicted in FIG. 13, and they are transmitting discovery signals, for example beacon frames. STA-A is a new STA that is not a part of the network yet. STA-A 136 shows up at the entrance of the room, and attempts to detect any available network. STA-A 136 is seen in FIG. 16A receiving 146 beacon frames transmitted from STA-6 138. STA-A 136 responds to these beacon frames with SSW frames 148 attempting to communicate with STA-6 138. STA-6 detects the SSW frame from STA-A, recognizes the signal is coming from a new STA, and it generates a new event 150. STA-A is also seen transmitting an Association request 152 to STA-6 trying to establish an active link. Upon reception of the Association request, STA-6 generates a new event 154.

So far STA-6 138 has generated two events. STA-6 performs a decision process to decide on what action to take (explained later). STA-6 also further shares the Event Data to its neighboring STAs, STA-5 and STA-3 by event data transmission 158 to STA-5 140, and event data transmission 162 to STA-3 142. By receiving these Event Data frames, STA-5 and STA-3 know what transpired with STA-6, and these STAs similarly perform their respective decision processes 160, 164, to decide on what action to take (explained later). STA-3 142, also further forwards 166 the Event Data to its neighbor STA-1 144, which is not a direct neighbor of STA-6. By doing so, the Event Data initiated from STA-6 is propagated throughout the network. Based on receiving this event data, STA-1 also performs a decision process 168 to determine an action.

Continuing the example in FIG. 16B, it is seen that after a while, another new STA, STA-B 134 shows up at the entrance of the room, and attempts to detect an available network. STA-B receives a beacon frame 170 transmitted from STA-6 138. STA-B responds with SSW frames 172 to communicate with STA-6. Upon reception of the SSW frames from STA-B, STA-6 generates a new event 174 and decides 176 on an action. In this example, the action STA-6 decides upon is to change 178 its own beacon signal transmission form. After this decision, STA-6 transmits Event Data and Notification of the signal form change to its neighbor STAs, depicting transmission 180, 184, 188, to STA-A, STA-5, and STA-3, respectively. STA-A, STA-5, and STA-3 each receive the Event Data frames and Notification frames, and perform decision processes 182, 186, and 190, respectively, for the action. Depending on the notified information, they may change their own beacon signal transmission form as well. In this example STA-3 142 changes 192 its signal form. STA-3 also propagates 194 the received Event Data and Notification to its neighbor STA-1 which is not a neighbor of STA-6. In this way, STA-1 also knows the changes of the signal form of STA-6 and STA-3, and decides 196 on any action to be taken. As STA-3 changes its signal form, it also generates 198 a notification to its neighbor STA-6, which decides 200 on an action and propagates 202, 206 the Notification to its neighbor STAs, which themselves decide 204, 208 on actions.

3.3.2. Centralized Management (Case 2)

Figure 17:
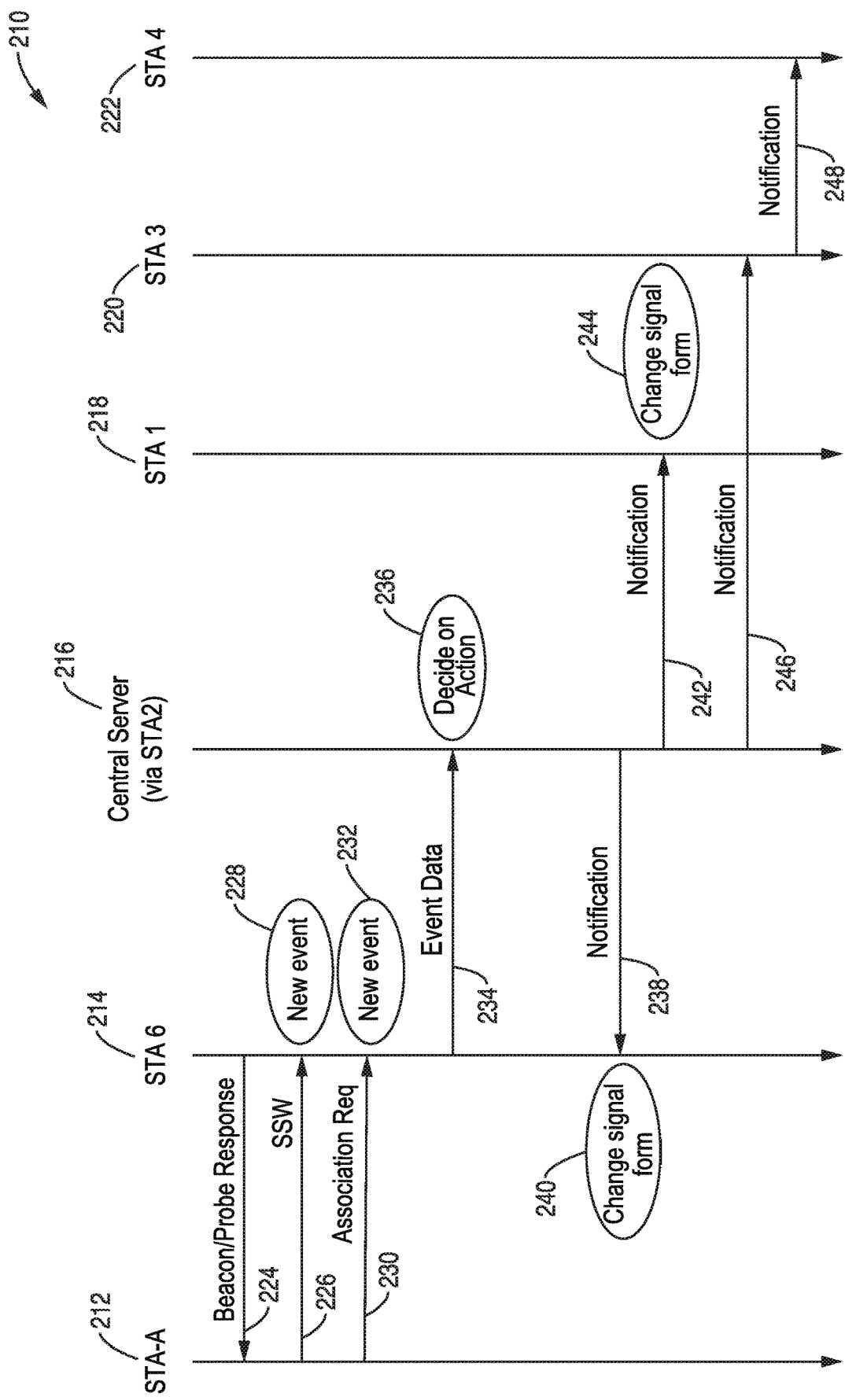
FIG. 17 is an information exchange sequence among stations using centralized management of adaptive beacon transmission according to an embodiment of the present disclosure.

FIG. 17 illustrates an example embodiment 210 of overall information exchange among STAs (STA-A 212, STA-6 214, Central Server via STA-2 216, STA-1 218, STA-3 220, and STA-4 222), according to a centralized management case according to the present disclosure.

Similar to the description in the prior section, the network detection of a new STA is considered the trigger event for this example. It should be appreciated, however, that the present disclosure also teaches that other types of events can be utilized to trigger the overall process as later described.

With a centralized management procedure, STAs report Event Data to a Central Server in the network. In this particular scenario, it is assumed for the sake of example that the Central Server is accessible from STA2 which has a gateway to an external network. Upon reception of the Event Data, the Central Server maintains its database to track events which have occurred on the network, and makes decisions on the adaptive signal form of each of the STAs. Overall information exchange among STAs are shown in FIG. 17. STA-1, STA-3, STA-5, and STA-6 are the same STAs depicted in FIG. 16 and they are transmitting discovery signals, such as beacons. STA-A 212 is a new STA that is not a part of the network yet.

STA-A 212 arrives at the entrance of the room, and attempts to detect any available network. STA-A receives 224 a beacon frame transmitted from STA-6 214. STA-A responds 226 with SSW frames to communicate with STA-6. STA-6 detects the SSW frame from STA-A, and recognizes the signal is coming from a new STA, and generates a new event 228. Also STA-A is seen transmitting 230 an Association request to STA-6 toward establishing an active link. Upon reception of the Association request, STA-6 generates a new event 232.

Thus, STA-6 now has two events, and transmits 234 an Event Data frame toward the Central Server. In this case, the Event Data frame is transmitted 234 to STA-2 216 that has access to the Central Server. Upon reception of the Event Data, Central Server performs a decision process 236 to decide on an action to take. This time, Central Server decided to change the signal form utilized by STA-6 and STA-1. Accordingly, the Central Station through STA-2 transmits Notification frames 238, 242 and 246 to the STAs in the network to inform them of the changes. In particular, it is seen that STA-2 transmits Notification frames to its neighbors STA-6, STA-1 and STA-3. Upon reception of the Notification frame, STA-6 214 and STA-1 218 change their signal form 240, 244, in this case changing their beacon signal transmission form as instructed in the Notification frame. Then STA-3 220 propagates 248 the Notification frame to STA-4 222, which could not be directly communicated with from central server 216. Thus, it is seen above that the network has adapted its transmission forms according to an event (in this example entry of a new STA) occurring on the network.

3.4. STA Monitoring Process

Figure 18A:
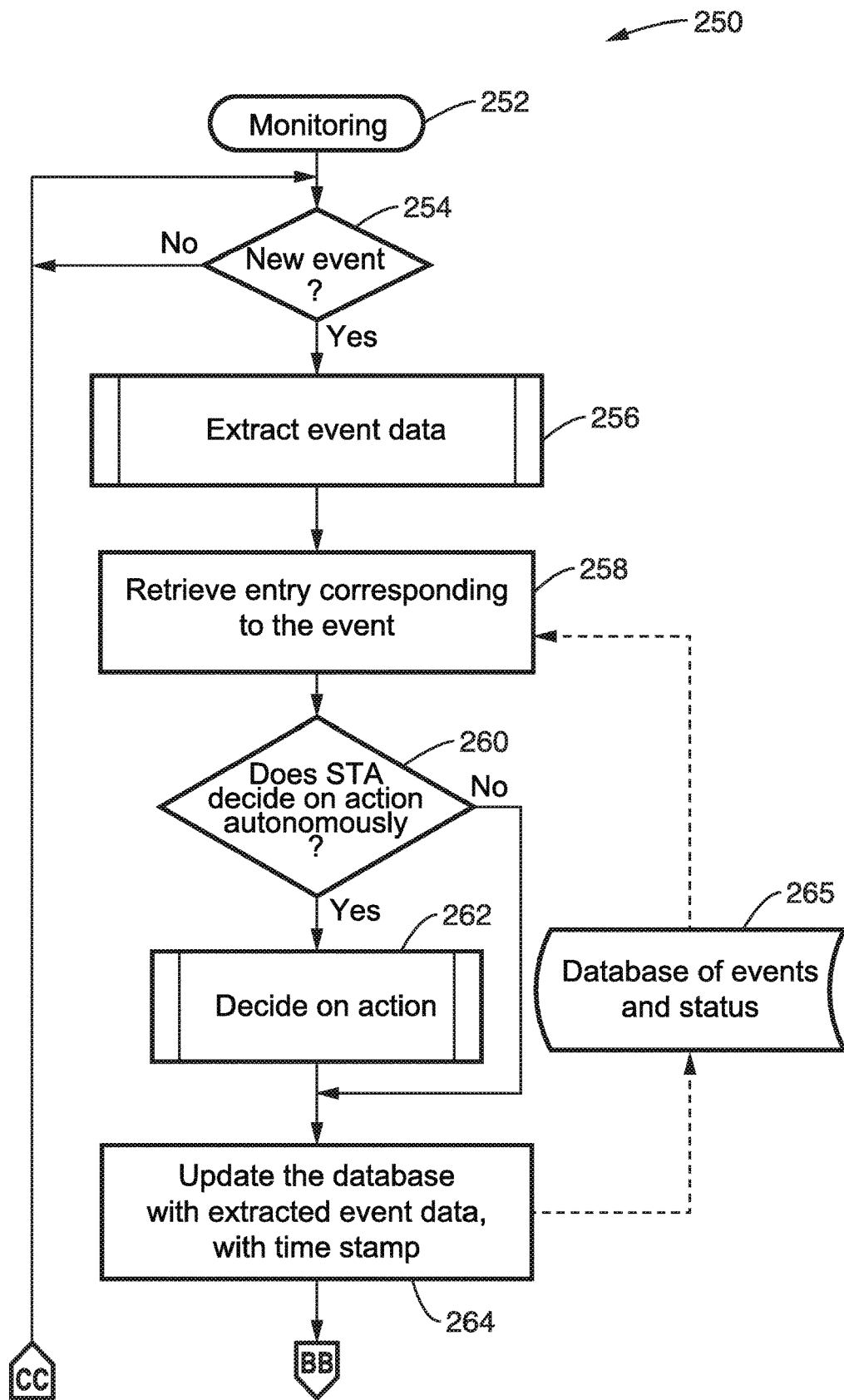
FIG. 18A and FIG. 18B is a flow diagram of monitoring for adaptive beacon transmission according to an embodiment of the present disclosure.
Figure 18B:
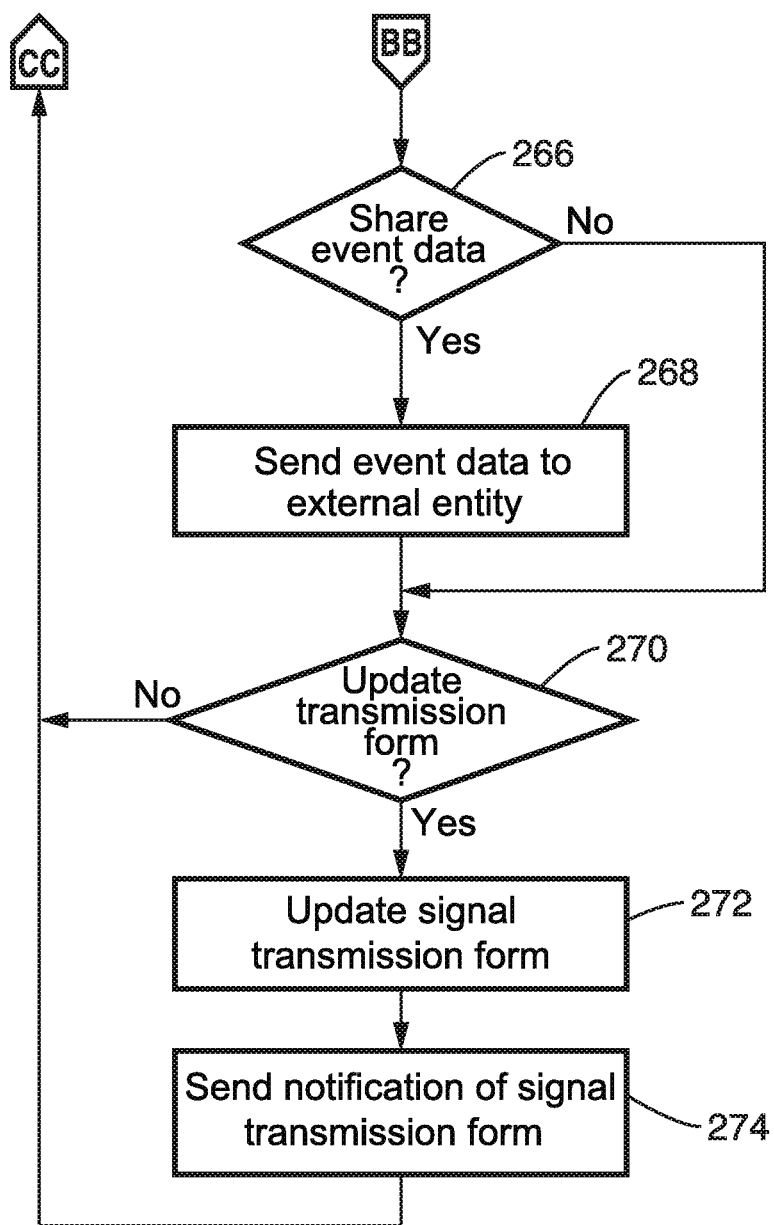

FIG. 18A and FIG. 18B illustrate an example embodiment 250 of station monitoring for performing network management. This section explains details about event monitoring and subsequent actions that a STA may take. The monitoring process performs not only monitoring of the event but also performs a sequence of logic steps for decision making and signal adaptation, when the STA and the network is performing a management procedure.

A STA always (periodically) monitors 252 for new events. At block 254 a check is made for a new event. If a new event has not occurred, then the process will perform later checks 254 for a new event. When a new event is detected, the STA extracts 256 event data and also manages a database of events and signal form status inside the STA. After extracting the event data, the STA retrieves 258 an entry of the database 265 corresponding to the event. If the STA is operating autonomously, such as according to a distributed management procedure, then the STA performs a decision process (e.g., runs logic) and performs the associated action autonomously. So accordingly, a check is performed at block 260 to determine if the STA is to decide on the action autonomously. If the STA is to act autonomously, then the STA decides on an action 262. In either case, the STA updates 264 the database 265 with the extracted event data and store the updated data to the database. It will be noted that the database 265 of events and status is available for later retrieval, such as seen from block 258.

Entering now into FIG. 18B, the STA determines 266 if the event data is to be shared with an external entity. A STA may not always share the event every time, but it may share the event when a sufficient amount, or importance, of data has been accumulated. If the STA determines that the event data should be shared with an external entity, it transmits 268 the event data toward the external entity. The Event Data transmission sequence has been previously explained in regards to FIG. 16A, FIG. 16B and FIG. 17.

A determination is made 270 on whether the STA should update its transmission form. When the STA is not operating autonomously, execution returns to block 254 in FIG. 18A. Otherwise, the STA is operating autonomously, such as according to a distributed management procedure, and it updates 272 its signal transmission form depending on the outcome from the decision making (block 262 in FIG. 18A). If the STA is to update its signal transmission form, it adjusts transmission form of the discovery signal, such as beacon frames. Details of the updates to the signal transmission form will be explained later. If the STA updates its signal transmission form, it will also communicate a notification 274 of signal transmission form to an external entity.

Figure 19A:
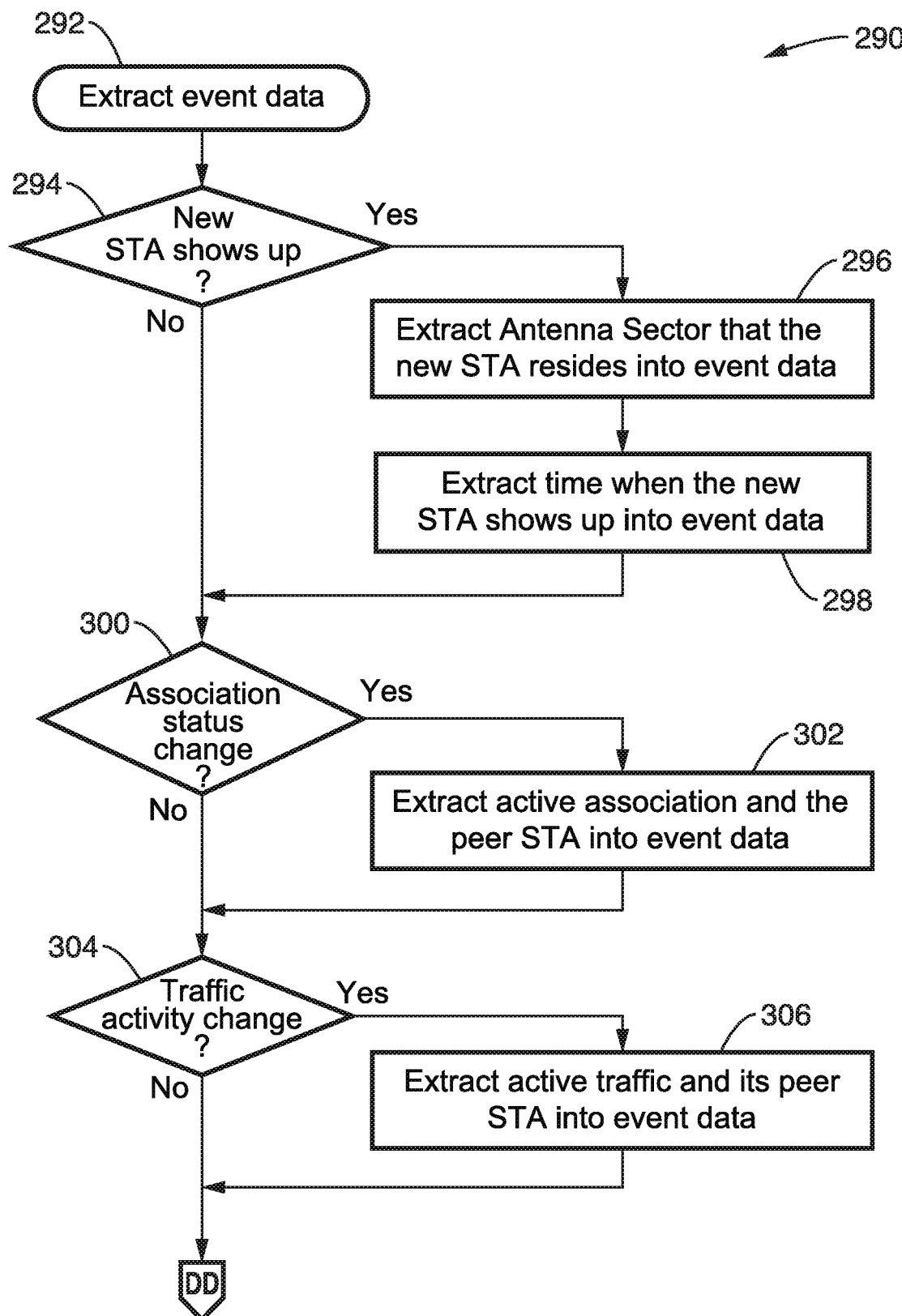
FIG. 19A and FIG. 19B is a flow diagram for event extraction for adaptive beacon transmission according to an embodiment of the present disclosure.
Figure 19B:
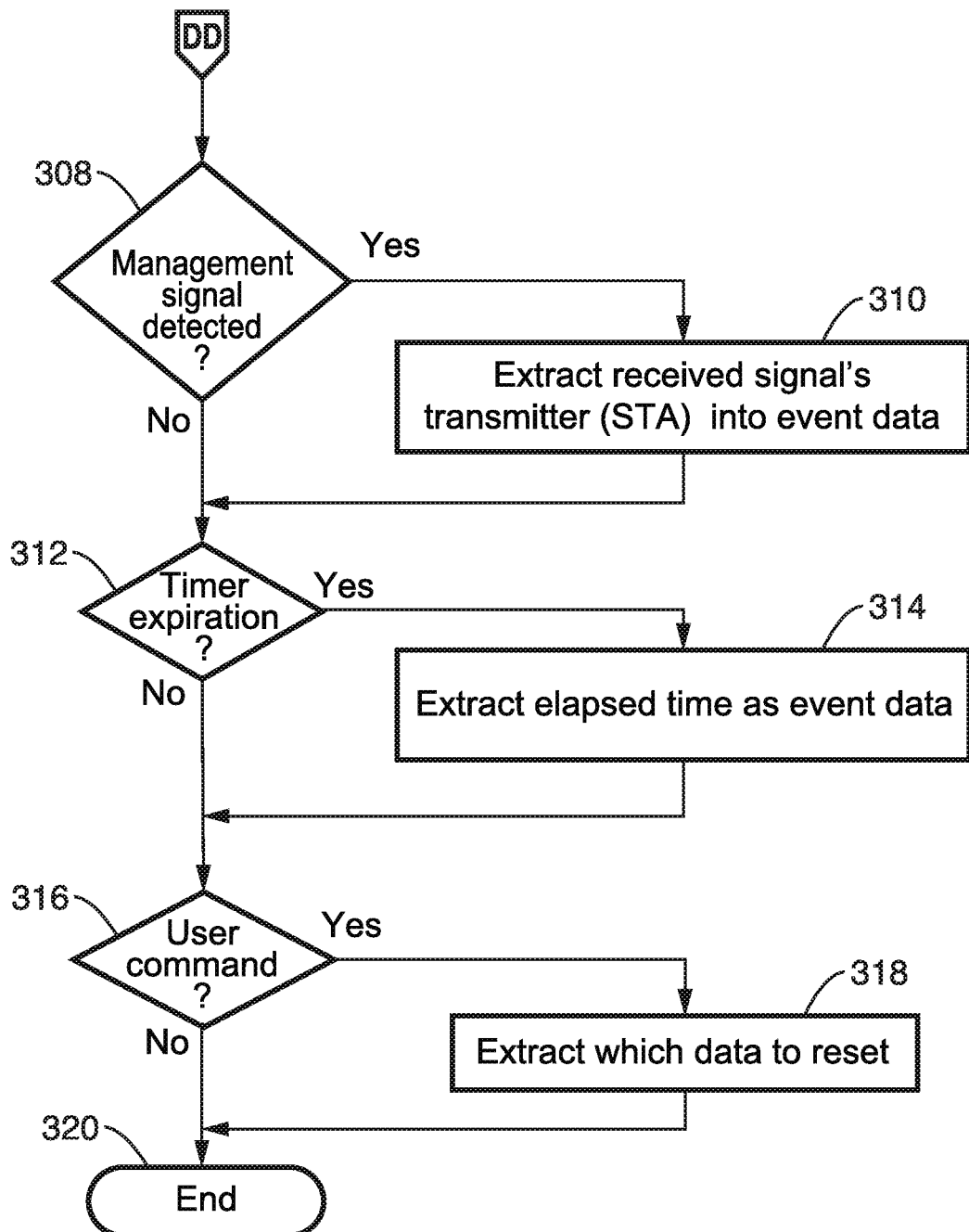

FIG. 19A and FIG. 19B illustrate an example embodiment 290 of event extraction, which captures the event to be recorded and shared. By way of example, the figure depicts six types of events, however, it should be appreciated that alternative or additional event types can be processed without departing from the teachings of the present disclosure.

The logic is shown using a simple follow through decision-tree pattern, however, it should be appreciated that other forms of decision logic can be utilized to meet the same objectives, such as table driven, tasking models, and the like which are configured for assessing multiple events and performing processes accordingly. For example in a table driven process, events can be mapped into a binary word to which is added a start address of a table. A jump to the table then routes execution according to the unique state of all the mapped events. The above is just to indicate that this and the other flow diagrams depicted in the present disclosure, illustrate but one form of logic which can result in performing the desired actions in response to network events and states.

The routine commences 292, and a check made 294 for a new STA. In the following flow descriptions, if a specific event is not detected, then execution moves to checking for the next form of event. If a new STA is detected, the STA extracts 296 the antenna sector at which the new STA resides, and puts the information into the corresponding event data. Then the STA also extracts and records 298 into the event data the time when the new STA shows up (is detected).

A check is made 300 to determine if the event is an association status change, indicating reception of the association request frame from a new STA, the completion of the association process, or cancellation of the active link. If the event is an association status change, then the STA extracts 302 the number of active links with neighbor STA(s), and stores the information into the corresponding event data.

A check is made 304 for a traffic activity change. If the event is traffic activity change, then the STA extracts 306 the traffic bandwidth and airtime usage of the active traffic that the STA is transmitting or receiving, and stores the information into the corresponding event data.

Reaching FIG. 19B, a check is made 308 for detecting management signals. If the event is a detection of management signals transmitted from neighboring STA, then the STA extracts 310 the signal transmitter (STA) identifier and averaged received signal strength, and stores the information into the corresponding event data.

A check is made 312 for detection of expiration (firing) of a housekeeping timer. If this event timer has expired, then the STA extracts 314 elapsed time based on the previous timer expired time, and stores the information to the corresponding event data. It should be noted that the STA runs (operates) the timer all the time, and expiration of the timer indicates the need to perform housekeeping functions.

A check is made 316 for detecting a command from a user, such as a system reset or memory refresh command. In this case the STA extracts 318 data to be removed, and stores the information to the event data, at which time the process ends 320.

According to the above example, the detected events are encoded into Event Data, which can be transmitted to one or more external entities.

3.5. Event Data Sharing

As was previously shown, the STA transmits Event Data to its neighbor STAs or Central Server, after extracting event data as described above. The Event Data is packed into a frame (packet), and transmitted over the wireless link.

Figure 20:
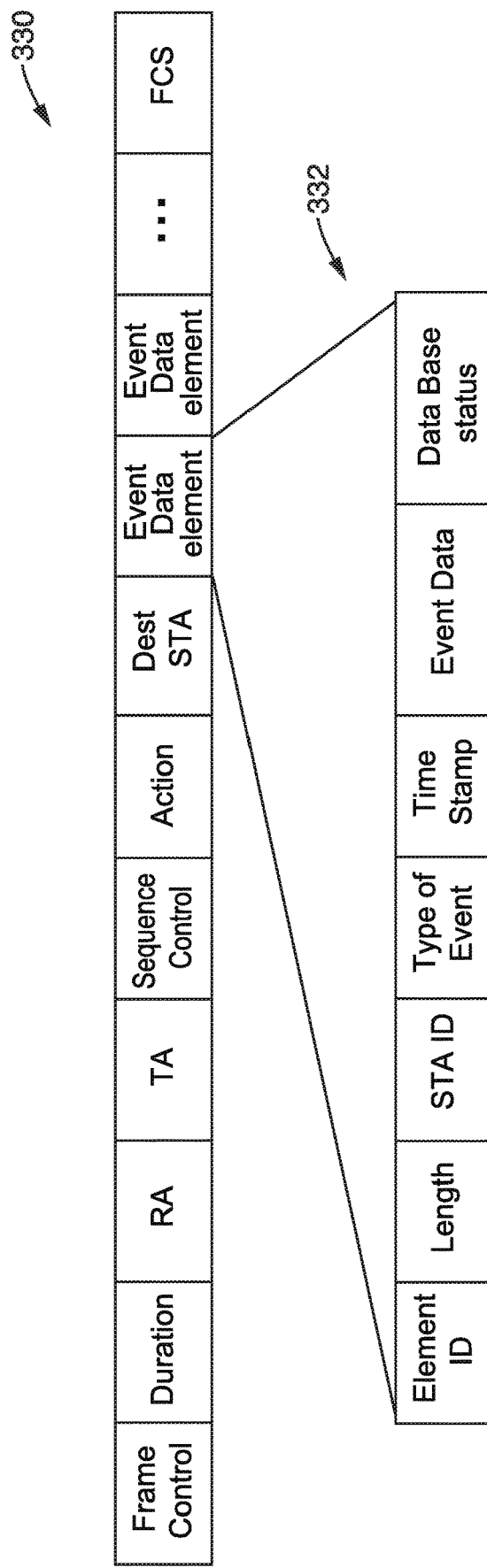
FIG. 20 is a data field diagram for an event data frame according to an embodiment of the present disclosure.

FIG. 20 illustrates an example embodiment 330 of an event data frame. A Frame Control field indicates the type of the frame. A Duration field contains navigation (NAV) information used for CSMA/CA channel access. The RA field contains address of the recipient of the frame. The TA field contains the address of the STA that transmits the frame. A Sequence Control field contains a sequence number to operate an automatic retransmission request (ARQ). An Action field indicates the action identifier which specifies what kind of action the recipient of the frame is directed to take. A Dest STA field indicates to whom the information in this frame is transmitted. In case of a distributed management procedure, in at least one embodiment this field can be set to broadcast an address so that the information can be shared among all STAs in the network. In case of a centralized management procedure, this field contains the address of the STA that is connected to the Central Server. Event Data element(s) contain the event data itself. Multiple Event Data elements can be contained in the frame, if the transmitting STA reports on multiple events at once. The frame ends with a frame check sequence (FCS) which allows a receiver to determine errors in the frame.

Within the Event Data element, are a number of fields 332, shown including an element ID field and length fields. The STA ID field presents the address of the STA that reports on the event. A Type of Event field provides an identifier of the event and indicates what kind of event the information element is reporting, for example detection of a new STA, association status change, traffic activity change, and so forth. The Time Stamp field contains the time at which the event occurred. The Event Data field contains the event data encoded, such as being as a result of the Extract event data routine depicted in FIG. 19A and FIG. 19B. The STA may also append a Data Base status field containing information stored in the Event Data database. The Receiver of the Event Data frame parses these elements, and can thus determine events that occurred at the STA that is reporting on this event.

3.6. Upon Event Data Reception

As was seen in previous figures (FIG. 16A, FIG. 16B and FIG. 17) the Event Data frames are received by neighboring STAs or a Central Server. The following section explains actions per Event Data reception.

3.6.1. Distributed Management (Case 1)

As was seen in FIG. 16A and FIG. 16B, when a distributed management procedure is utilized, the Event Data frames are received by the neighboring STAs. Also, as seen in the figure, neighboring STAs will receive Notification frames when the signal transmission form has been changed.

Figure 21:
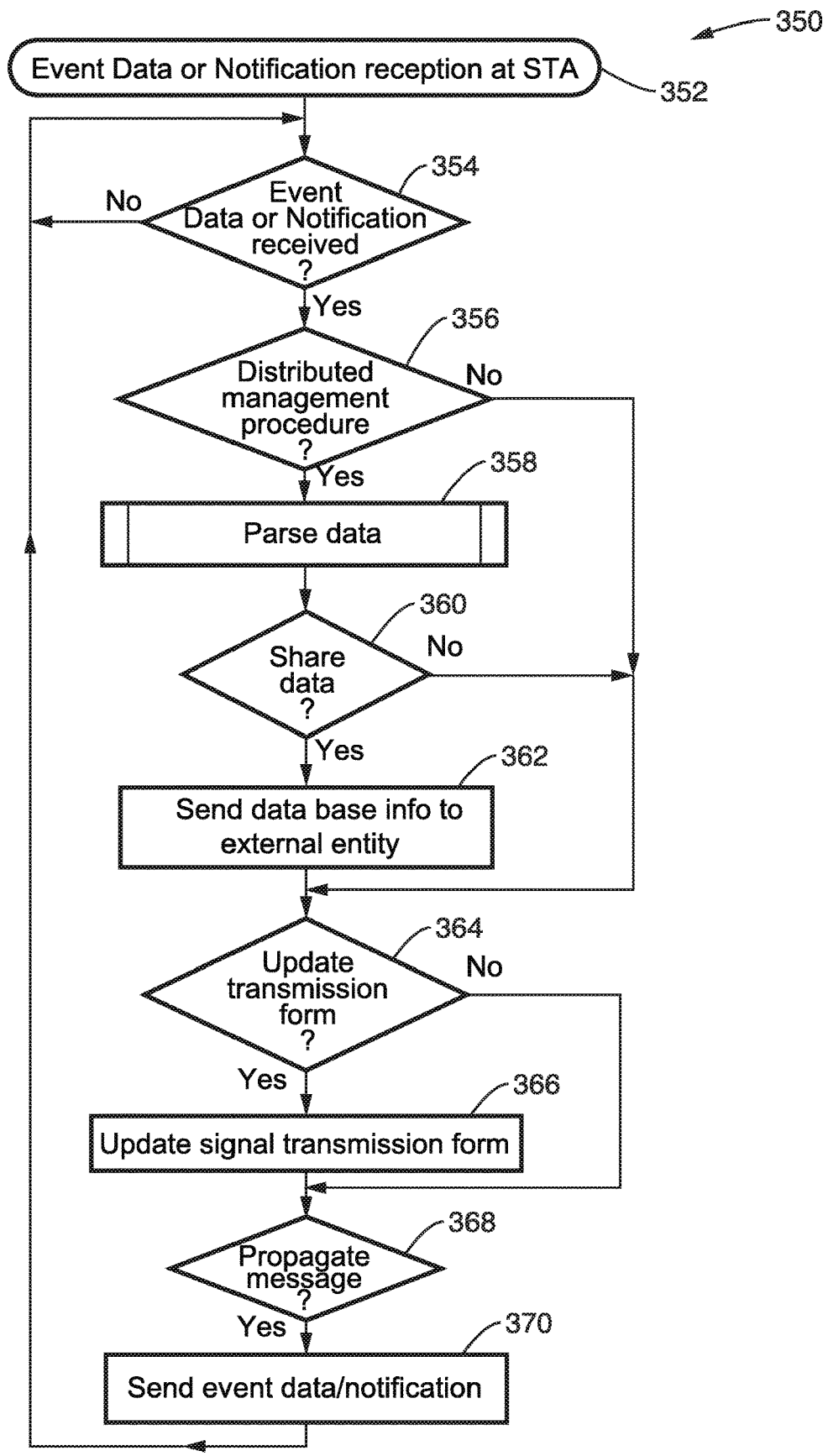
FIG. 21 is a flow diagram for event data and notification for adaptive beacon transmission according to an embodiment of the present disclosure.

FIG. 21 illustrates an example embodiment 350 of utilizing a distributed management procedure when Event Data frames are received by neighboring STAs. Upon reception of Event Data or Notification, the STA executes the signal processing flow seen in figure. Also, as seen in the figure, neighboring STAs receive Notification frames when signal transmission forms have been changed.

The process starts 352, and a check 354 is made for receipt of an event data or notification frame. When a STA receives an Event Data frame or a Notification frame, the STA starts the frame parsing and subsequent signal processing. If the STA is operating distributed management procedure, as seen in blocks 358, 360 and 362, it will parse the received frame and share the received information and decided action with neighboring STAs as necessary. If the STA is operating centralized management procedure, it skips that set of operations. Specifically, a check is made 356 for a distributed management procedure. If it is not a distributed management procedure, then execution moves (jumps) down to block 364. Otherwise, to process a distributed management process, the data (event data or notification data) is parsed 358, and a check 360 made on whether to share the data with other STAs. If it is not to share the data, then execution moves to block 364. Otherwise, if it to share the data, then block 362 is reached which sends the data base information regarding the event to at least one external entity.

Reaching block 364, the STA determines if it shall update the discovery signal transmission form. When the STA is operating according to a distributed management procedure, this determination is made in the Parse data subroutine (as discussed in a later section). If the STA is operating according to a centralized management procedure, this determination is made by parsing a received Notification frame from the Central Server. If the Notification frame contains suggested actions to the STA, it will update its discovery signal transmission form as instructed by the Notification frame.

If the STA determines that it shall update its transmission form, it updates 366 its own discovery signal transmission form. The manner in which the signal form is updated is described in a later section. Then block 368 is reached in which the STA determines if it shall propagate either or both Event Data and/or Notification to other STAs.

If the STA is operating according to a distributed management procedure, it will try to propagate the Event Data/Notification to its neighbor STAs, so that all the STAs in the network can share the same information. Determination of which neighboring STAs to transmit the information to is determined by the routing table that the STA maintains. The particulars of this determination on sharing extent or the use of the routing table, are not within the scope of the present disclosure. Thus, reaching block 370 event data and/or notification data are sent to other STAs, and execution moves back to block 354.

If the STA is operating according to a centralized management procedure, then the STA attempts to propagate the received Event Data or Notification based on the routing table that the STA maintains. Which neighboring STAs to transmit the information is determined by the routing table that the STA maintains.

Figure 22:
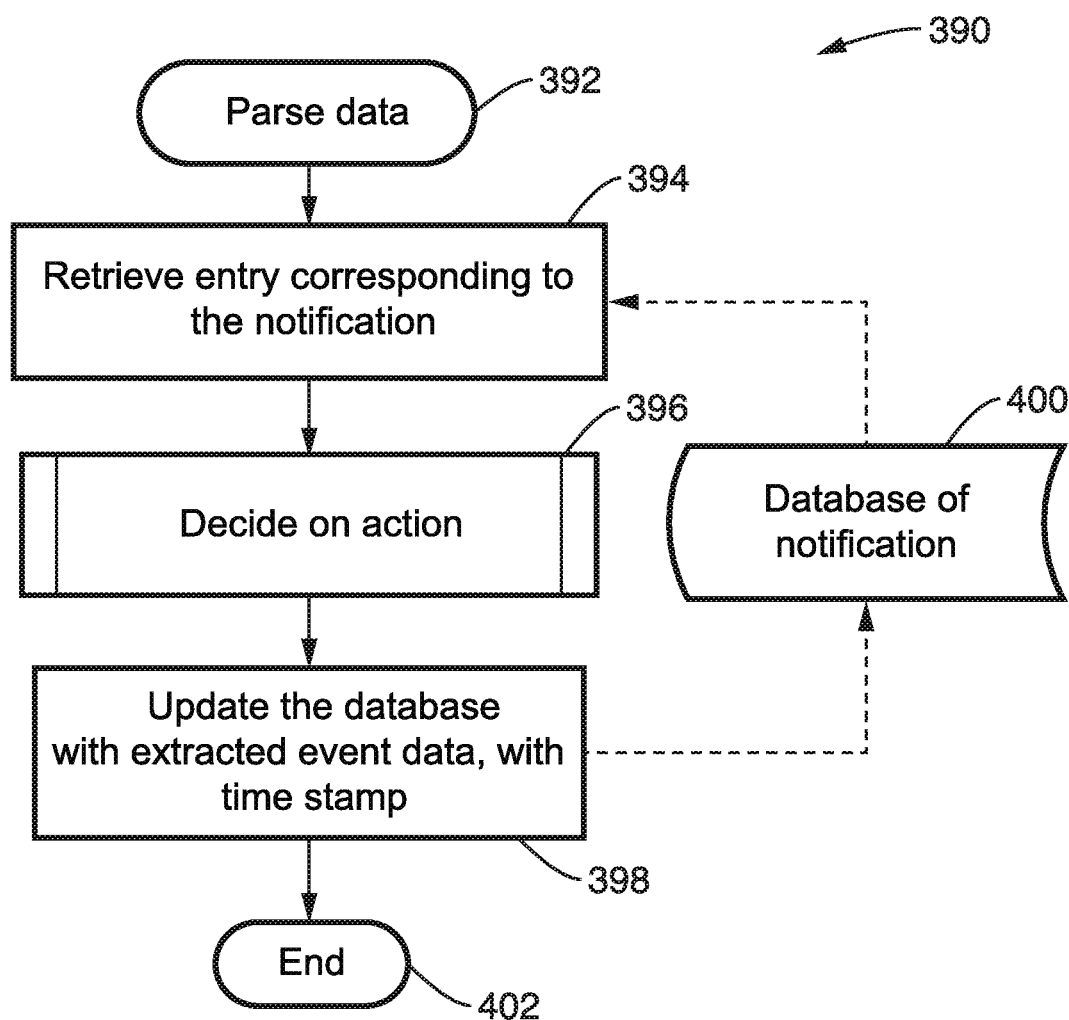
FIG. 22 is a flow diagram for parsing data for adaptive beacon transmission according to an embodiment of the present disclosure.

FIG. 22 illustrates an example embodiment 390 of Signal processing flow inside a Parse data routine in which the STA determines actions and manages a database of received Event Data and Notifications. Processing starts 392, and the STA retrieves 394 an entry of the database 400 corresponding to the received information. Then, the STA executes a process to determine/decide 396 on an action to be performed based on the received information and information stored in the database. The STA updates the database 398 with the received information and stores the updated data to the database, ending 402 the parsing process.

3.6.2. Centralized Management (Case 2)

As was shown in FIG. 17, when a centralized management procedure is followed, the Event Data frames are received by the Central Server.

Figure 23:
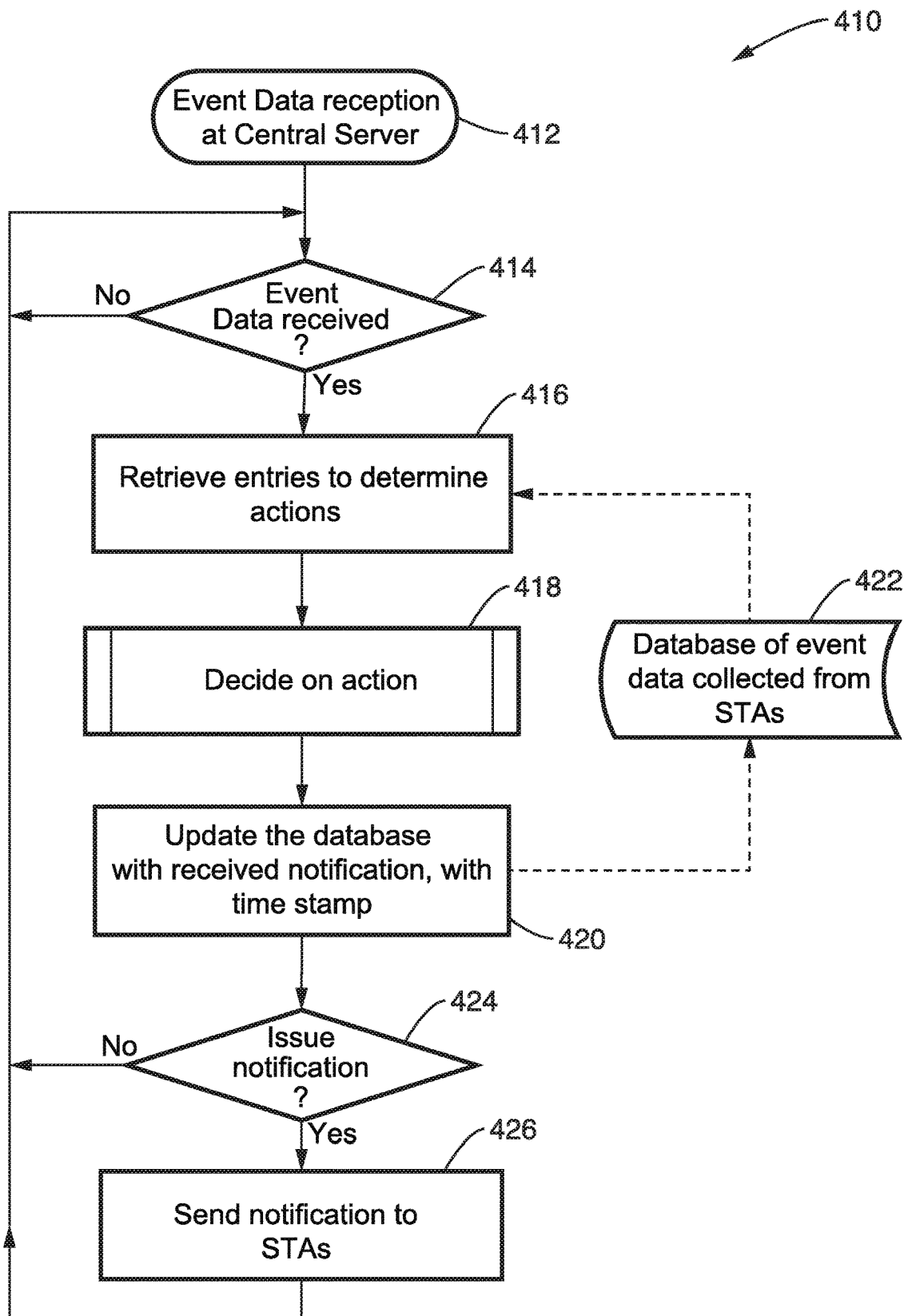
FIG. 23 is a flow diagram for event data reception at a central server for adaptive beacon transmission according to an embodiment of the present disclosure.

FIG. 23 illustrates an example embodiment 410 of signal processing flow for Event Data reception at the Central Server. The process starts 412 and a determination 414 is made if event data has been received. If not received, then a later check 414 will be made for event data. If event data has been received, then entries are retrieved 416 from a database 422 of event data collected by the STAs, to determine actions. It will be noted that in this case, the Central Server manages the database of received Event Data. Then, a decision process is executed 418, as previously exemplified, to decide on the action based on the received information and information stored in the database. The STA then updates 420 the database 422 with the received information and stores the updated data to the database.

A determination is made 424, if any performed actions result in changes to which one or more STAs should be notified. If no notifications are needed, then execution returns to block 414 in checking for event data. If, however, the outcome from the action decision process results in updating signal transmission forms, as determined at block 424, then the STA sends Notification 426 to the STAs in the network, so that the decided actions are taken at the corresponding STA(s), before returning to block 414 to check for event data.

3.7. Decision Making

Figure 24A:
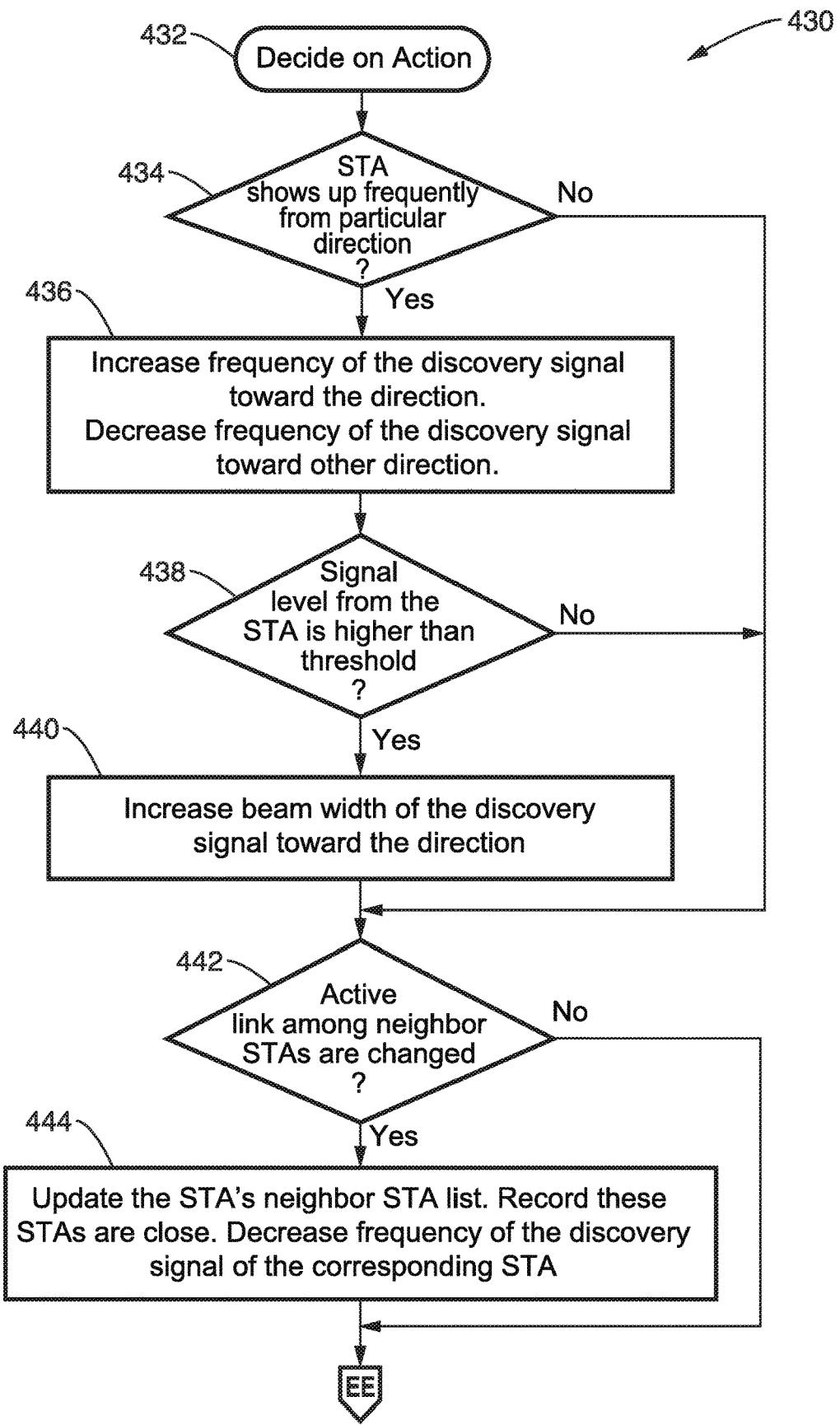
FIG. 24A through FIG. 24C are a flow diagram for an action decision routine for adaptive beacon transmission according to an embodiment of the present disclosure.
Figure 24B:
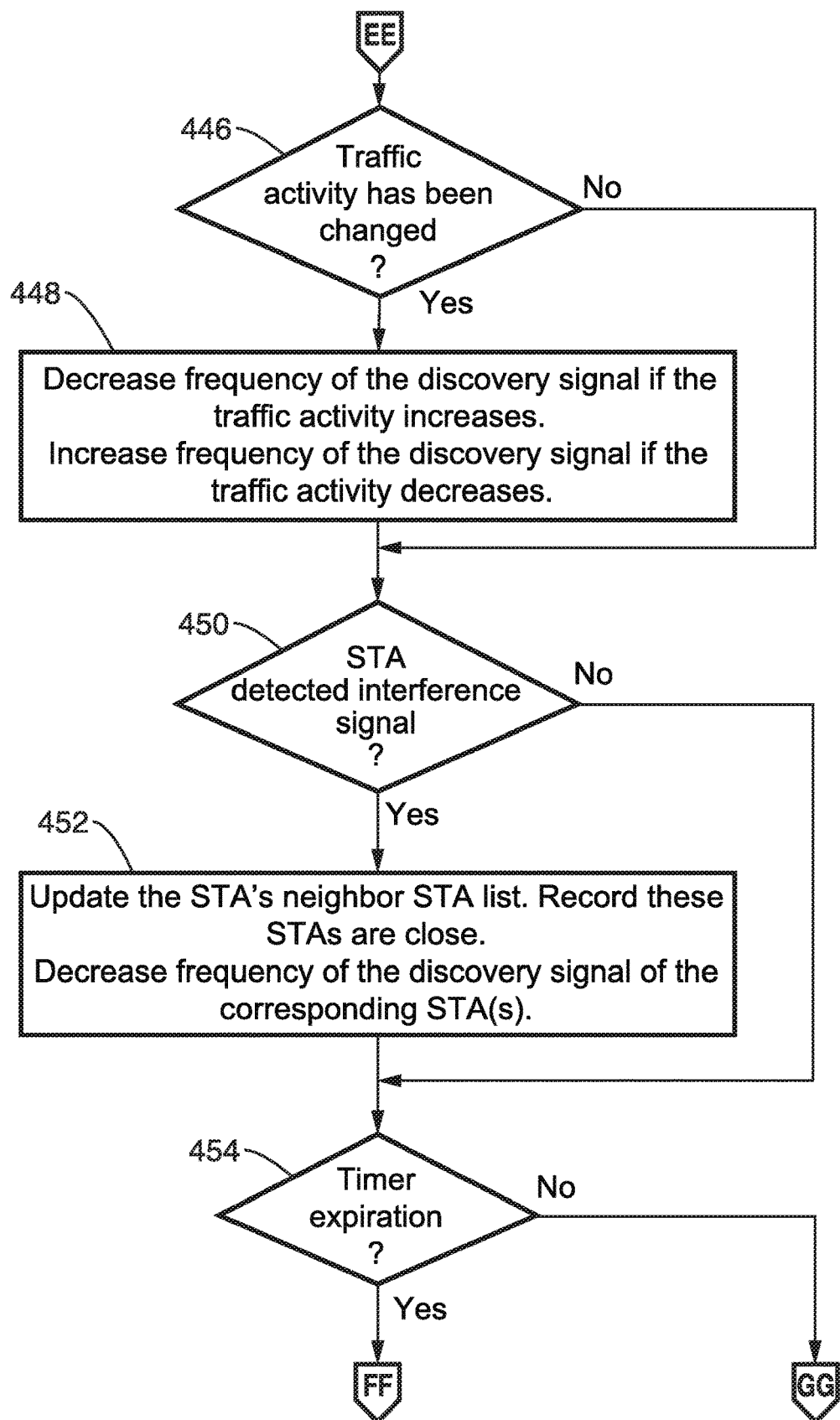
Figure 24C:
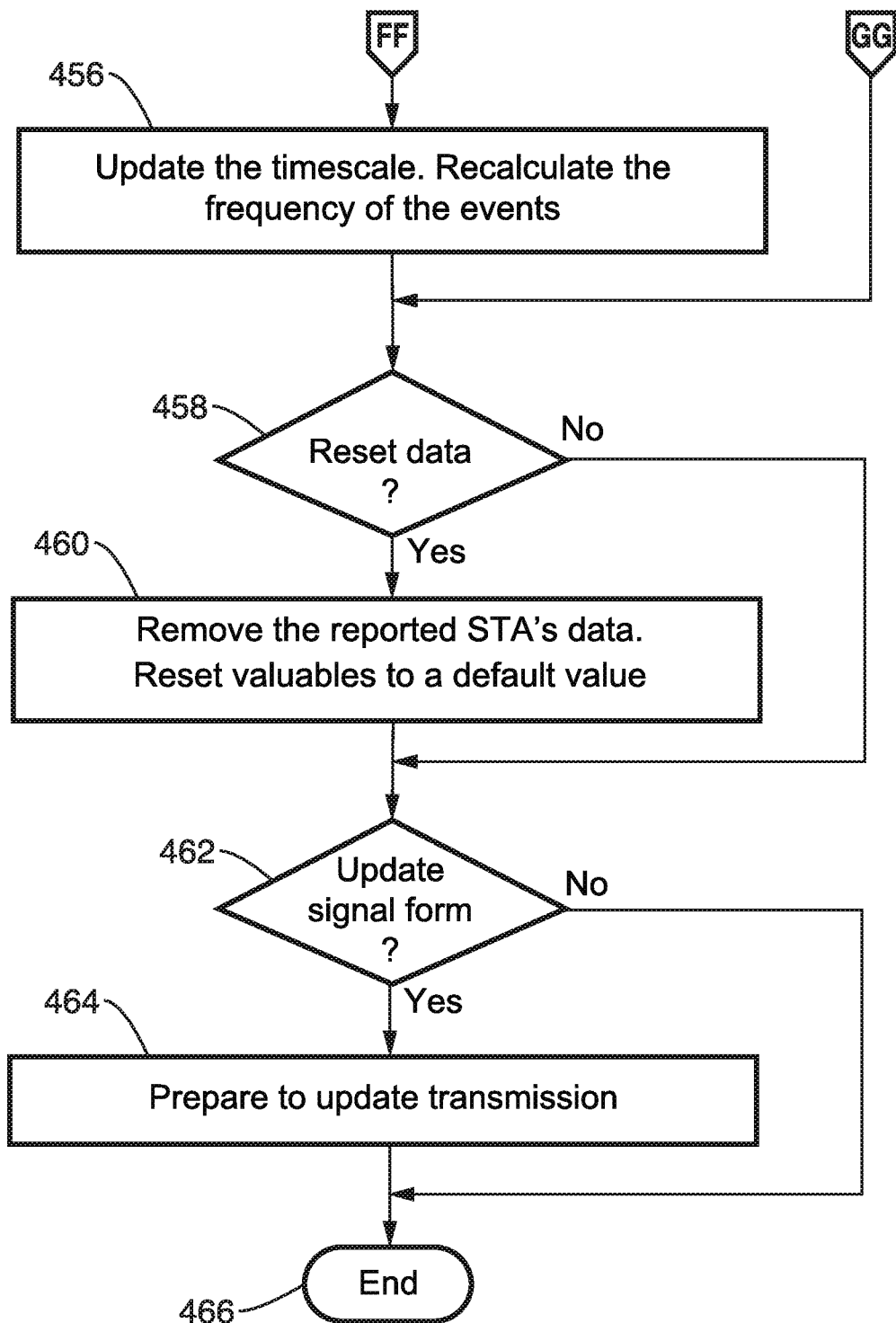

FIG. 24A through FIG. 24C illustrates an example embodiment 430 of decision making regarding changing the form of transmission being performed. The STA in a distributed management procedure and the Central Server incorporate decision making programming (e.g., software module), referred herein as a decision module. The decision module executes steps (e.g., runs logic) as described here for determining if the signal transmission form is to be updated. The decision is made in reference to database information which has been updated by the received Event Data. It should be noted that the database contains the history of the events detected in the past. As such, the decision module can obtain statistics of the events. The following describes the particulars of this process.

The process of deciding on an action to take commences 432 in FIG. 24A, when the event reported on a new STA is detected. The decision module determines 434 if new STAs are detected at a particular STA from a particular direction frequently. If new STAs are not detected then execution proceeds to block 442. Otherwise, if the determination is true, then the decision module intends to update the transmission form 436 to increase frequency of the discovery signal toward the direction from the STA, and decrease frequency of the discovery signal toward other directions, and decrease frequency of the discovery signal transmitted by other STAs.

Then the decision module determines 438 if the averaged signal level of the new STA, received at the particular STA from the particular direction, is higher than a threshold. If the determination is false, execution jumps down to block 442. Otherwise, since the threshold has been exceeded, block 440 is reached to adapt the transmission form, and for this specific example the beam width of the discovery signal of the particular STA is increased that is transmitted at the particular direction.

Block 442 is reached which determines if an active link between stations has been changed. For example, when an event is reported on a newly established active link in which the decision module updates the network topology information. If the active link has been changed, then an update 444 is performed on the STA's neighbor list, and it also records that these STAs are close in proximity. This information is used to determine a route from one STA to another STA.

A check is made 446 in FIG. 24B on traffic activity changes. If no changes are found, then execution reaches block 450. However, if traffic activity has changed, then block 448 is executed which updates the signal form to decrease frequency of the discovery signal transmitted if traffic activity increases, or to increase frequency of the discovery signal transmitted, if the traffic activity decreases. The decision module thus picks up a STA whose traffic activity is less than another and decreases frequency of the discovery signal of the picked up STA.

A determination is made at block 450 to check for a detected interference signal. If no interference signal, then execution moves to block 454. Otherwise, when an event is reported on detection of an interference signal, i.e., reception of management frames from a neighbor STA, then the decision module updates 452 neighbor STA list, records that these STAs are close, and changes the transmission form to decrease frequency of the discovery signal transmitted by one of the STA that established the active link. Thus, the decision module picks up a STA whose traffic activity is less than another and decreases the frequency of the discovery signal of the picked up STA.

A timer expiration determination 454 is reached. If it has not expired, then execution moves to block 458 in FIG. 24C. Otherwise, when the event reports on timer expiration event of a STA, then the decision module updates 456 in FIG. 24C the timescale of the history of the event. It recalculates the frequency of the events maintained in the database. The decision module may intend to change transmission form of the STA(s), upon change of the frequency of the event.

A determination is made at block 458 if a reset data command was received from a user. If not true, then execution moves to the next decision at block 462. Otherwise, if the data is to be reset, then the decision module removes 460 event history of the corresponding STA from its database and sets the transmission form to a default form.

After the series of determinations above, the decision module determines at block 462 if the discovery signal transmission form is to be updated. If no updates, or the updates are not sufficiently significant, then execution ends 466. It should be appreciated that the signal form may not be updated even if the decision module intends to update it when the effect of the signal form change is minor (e.g., below a threshold level). If the intended changes are sufficiently significant, however, the decision module prepares 464 commanding an update of the transmission form. If the network is operating a distributed management procedure, it will issue a command to change the transmission form of the STA. If the network is operating centralized management procedure, it will issue Notification to STAs in the network.

3.8. Notification Data Structure

When an STA operating a distributed management procedure changes its discovery signal transmission form, it will issue a Notification frame to neighboring STAs to tell them that the signal form has been changed. Similarly, in a centralized management procedure, the Central Server issues Notification frames to STAs in the network to let them order or inform the update of the signal transmission form.

Delivery of the Notification frames was already discussed in relation to FIG. 16A, FIG. 16B and FIG. 17.

Figure 25:
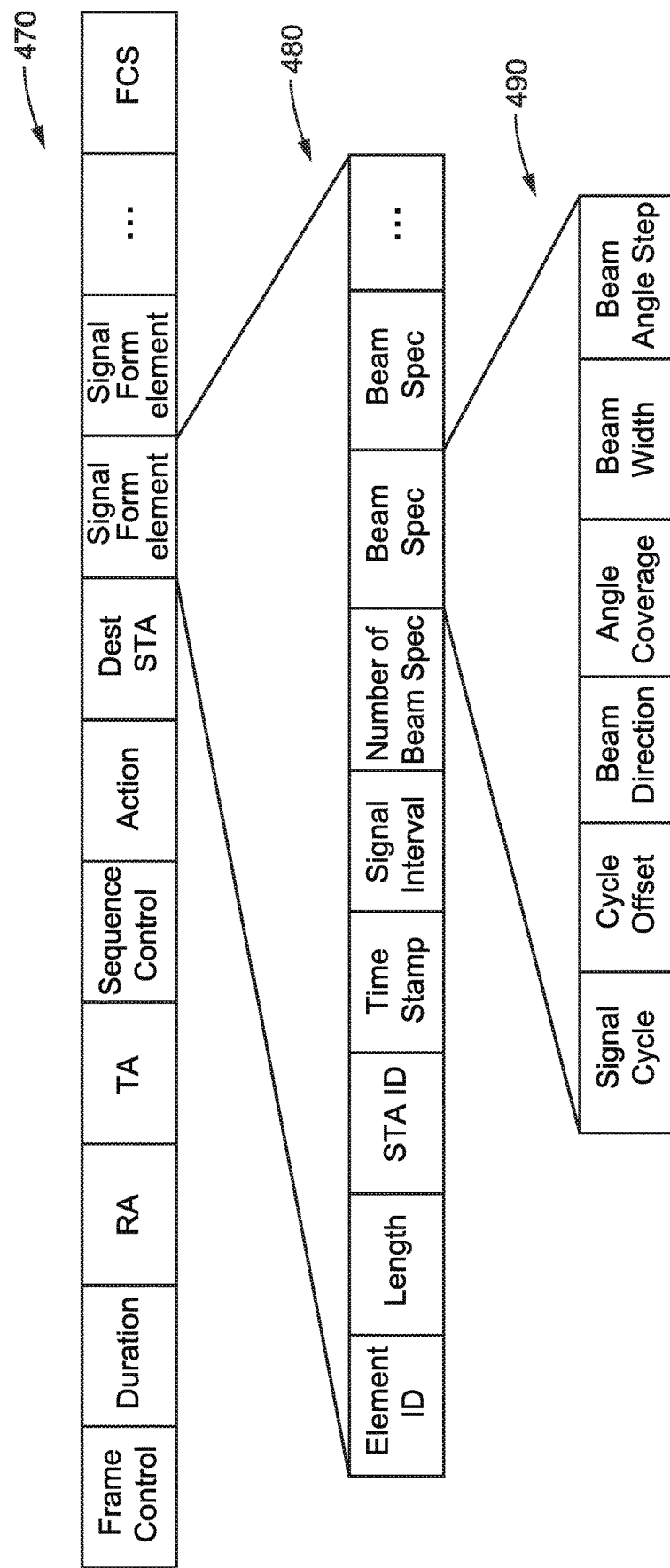
FIG. 25 is a data field diagram for a notification frame according to an embodiment of the present disclosure.

FIG. 25 illustrates an example embodiment 470 of a Notification frame. The notification frame contains the following fields. A Frame Control field indicates the type of the frame. A Duration field contains NAV information used for CSMA/CA channel access. An RA field contains an address of the recipient of the frame. A TA field contains an address of the STA that transmitted the frame. A Sequence Control field contains a sequence number to operate an automatic retransmission request (ARQ). An Action field indicates the action identifier which indicates what kind of action the recipient of the frame is directed to take. A Dest STA field indicates to whom the information in this frame is being transmitted. In many cases, this field is set to a broadcast address so that the information can be shared among all STAs in the network. In case of centralized management procedure, this field may contain the address of the STA that is directed to change signal transmission form in response to this notification. A Signal Form element contains information on how the discovery signal form should be transmitted. It is possible that multiple Signal Form elements are contained in the frame if the Notification reports on multiple STA's signal form changes. The frame ends with a frame check sequence (FCS) which allows a receiver to determine errors in the frame.

Within the Signal Form element are the following fields 480. An element ID field and length field. A STA ID field presents the address of the STA that the signal form update is (or will be) applied to. A Time Stamp field specifies the effective time of the update to the discovery signal. A Signal Interval field indicates the interval of a series of discovery signal transmissions. A Number of Beam Specification field indicates the number of Beam Specification elements contained in the Signal Form element. It is possible that multiple Beam Specification fields are contained in a single Signal Form element, if the beam pattern is updated with an irregular pattern.

Each Beam Specification element contains sub-fields 490 for directing beam changes in the form of the discovery signal transmission after the update is applied. At least one embodiment of these fields are exemplified as a signal cycle, cycle offset, beam direction, angle coverage, beam width and beam angle step. Signal Cycle sub-field indicates the repeat cycle of the discovery signal transmission. If the field is set to 1, the same discovery signal form is used every time the STA schedules a series of discovery signal transmission. If the field is set to 3, the discovery signal transmission pattern is repeated every 3 beacon periods. The Cycle Offset sub-field contains the starting timing of the beam pattern ordered by the Beam Spec element within the Signal Cycle. Beam Direction sub-field indicates the angle direction of the center of the series of the discovery signals that are suggested by the Beam Spec field. Angle Coverage sub-field contains the total angle of transmit discovery signals that the STA should cover. Depending on the value, STA may cover 180 degree of the coverage or 60 degree of the coverage, etc. Beam Width sub-field indicates beam width used for the discovery signal that are suggested by the Beam Spec field. Beam Angle Step sub-field indicates the angle step between the beams suggested by the Beam Spec field.

Receiver of the Notification frame parses these elements, and can obtain which STA shall transmit discovery signals in what form. In case of centralized management procedures, a STA that received a Notification frame of which STA ID field in the Signal Form element equals to its own address shall propagate the rest of the element, while setting its own discovery signal transmission form as indicated in the element. It is possible that a single Notification frame contains multiple Signal Form elements, where multiple element contains the same STA ID. In such a case, the STA indicated in the STA ID field shall parse corresponding Signal Form elements and update its signal form so that the transmitting signal meets requirements from all corresponding elements. In this case, the STA's discovery signal form could be varying per transmit timing or the direction of the antenna (See signal form of STA-4 in FIG. 30).

3.9. Signal Adaptation

As a consequence of the signal form update, STAs will change their discovery signal transmission form. This is an effect of step 360 in event or notification reception seen in FIG. 21. In this section, it is described how the signal form is changed, referring to the figures below.

3.9.1. Changing the Frequency of the Discovery Signal

Figure 26:
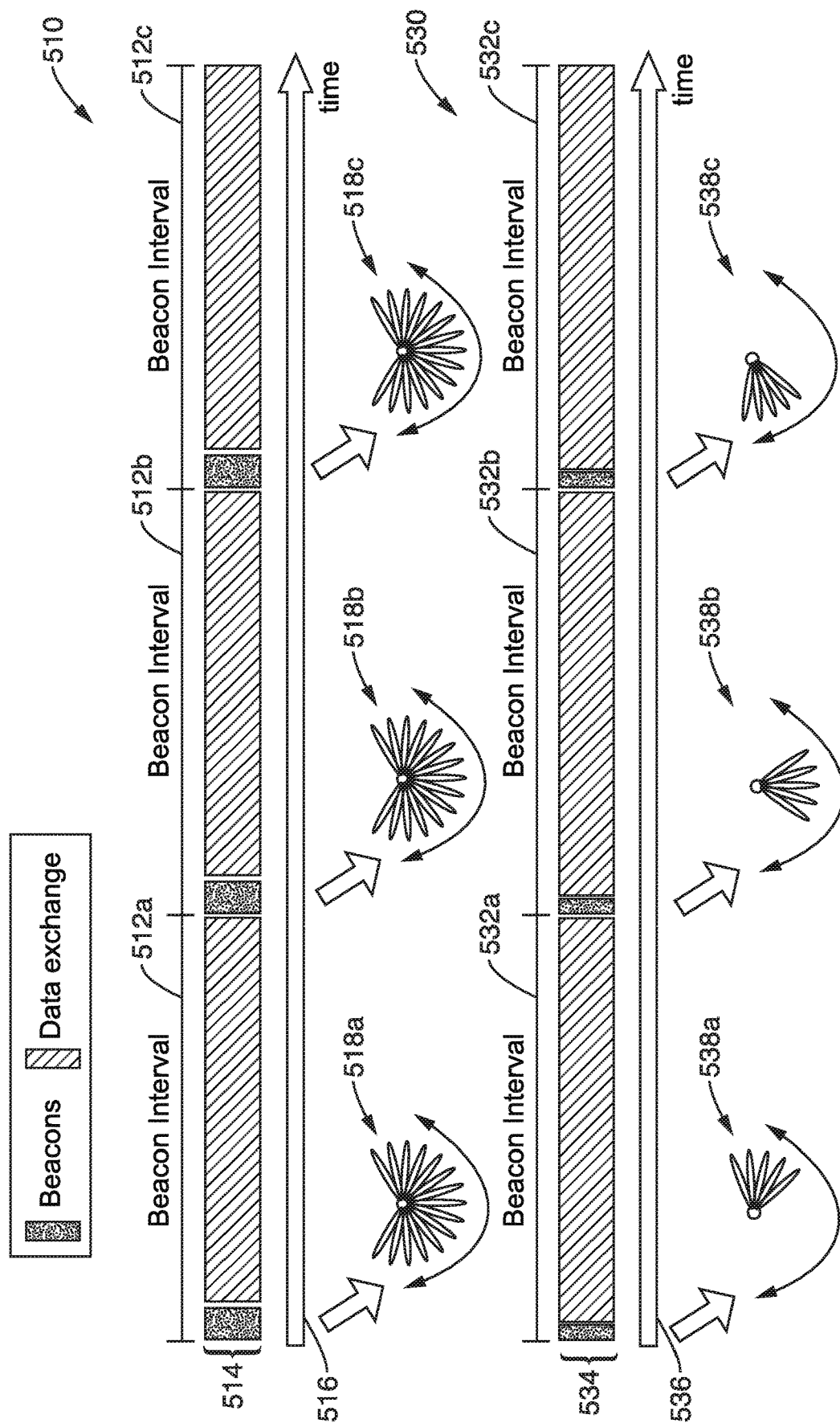
FIG. 26 is a signal form adaptation diagram showing signal form changes for a first case utilized according to an embodiment of the present disclosure.

FIG. 26 illustrates an example embodiment 510, 530 showing a transmission form change (case 1). Originally, the STA is transmitting beacon frames 514 as its discovery signal, depicting beacon intervals 512*a*, 512*b*, and 512*c* over time span 516. These beacon signals cover over 180 degrees with 15 narrow beams, as seen in the patterns 518*a*, 518*b* and 518*c*. By way of example and not limitation, in the example the beacons are transmitted every 100 msec regularly.

As a consequence of the transmission signal form update, STAs will change their discovery signal transmission form as shown 530. In this case the STA receives a command to update the frequency of the signal, and particular to this example, the STA is directed to decrease frequency of the transmission to ⅓, with Signal Cycle of 3. Beacon frames 534 are transmitted as its discovery signal, depicting beacon intervals 532*a*, 532*b*, and 532*c* over time span 536. The adapted beacon signals each cover ⅓ of the original span, which is seen as the 5 narrow beams, with direction changing with each beacon interval from pattern 538*a*, to 538*b* and finally to 538*c*, before it would return to what is seen in 538*a*. Thus, it is seen that the STA transmits only 5 (one third of 15) beams in a beacon transmission time, while consuming 3 beacon transmission intervals to cover the desired angle, and repeats the cycle per 3 beacon interval.

Figure 27:
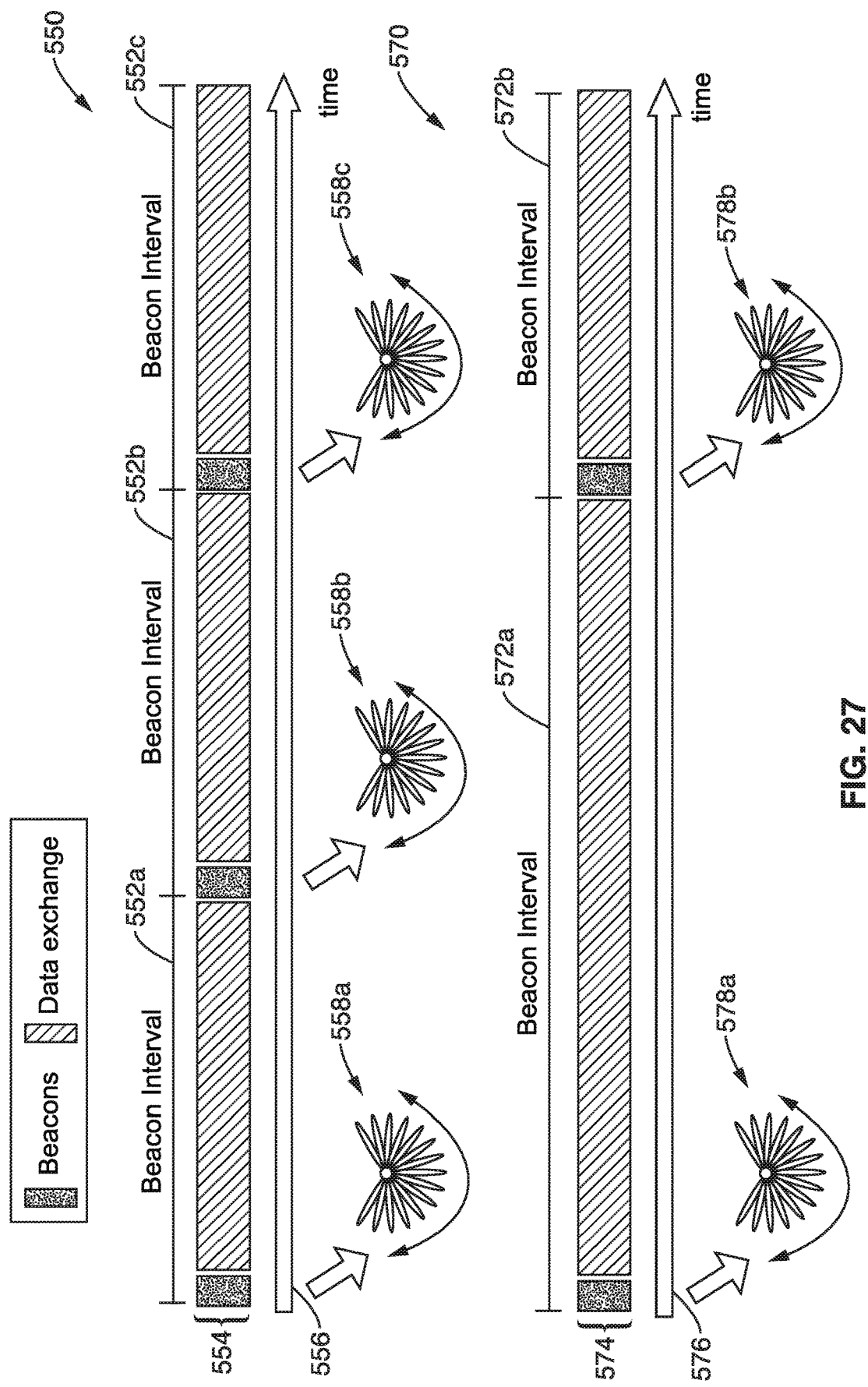
FIG. 27 is a signal form adaptation diagram showing signal form changes for a second case utilized according to an embodiment of the present disclosure.

FIG. 27 illustrates an example embodiment 550, 570 of a signal form change (case 2), where the STA receives command to update the frequency of the signal.

Originally 550, the STA is transmitting beacon frames 554 as its discovery signal, depicting beacon intervals 552*a*, 552*b*, and 552*c* over time span 556. These beacon signal covers over 180 degrees with 15 narrow beams, as seen in the patterns 558*a*, 558*b* and 558*c*. The beacon is transmitted every 100 msec regularly.

As a consequence of the signal form update, STAs change their discovery signal transmission form 570. In this example, the STA is directed (commanded) to decrease frequency of the transmission by ½, with a Signal Interval of 2. Thus, beacon intervals 572*a*, 572*b* are increased (doubled) to 200 msec (2 times from the default value), whereas the STA maintains a number of beams in a beacon transmission time. The figure depicts the transmissions 578*a*, 578*b* having the same number of beams as before, but spread out over a longer interval.

3.9.2. Changing Beam Width of Discovery Signal

Figure 28:
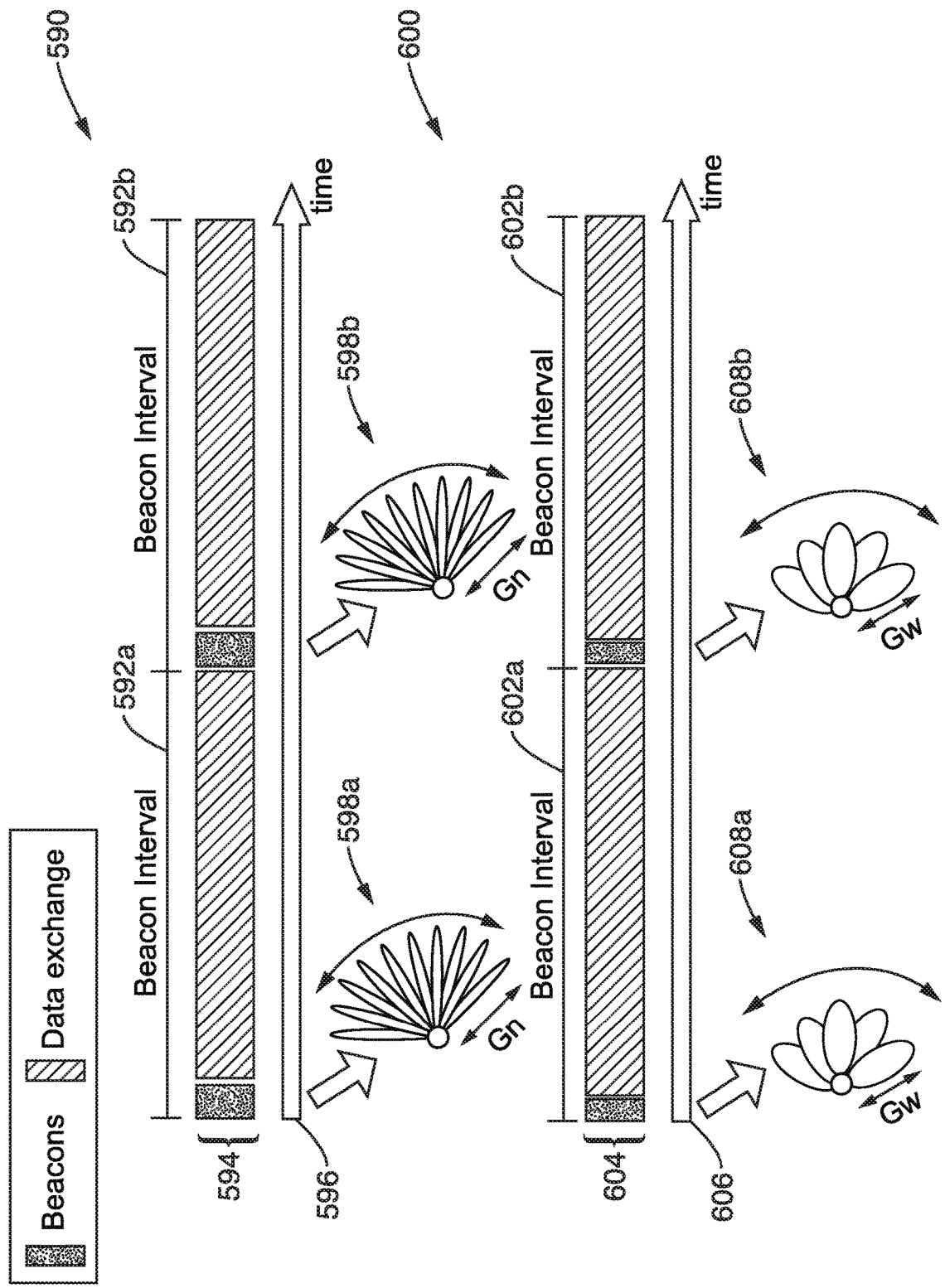
FIG. 28 is a signal form adaptation diagram showing beam width changes of the signal according to an embodiment of the present disclosure.

FIG. 28 illustrates an example embodiment 590, 600 showing a signal transmission form update. Originally 590, the STA is transmitting beacon frames 594 as its discovery signal with beacon intervals 592*a*, 592*b* with beacon signals 598*a*, 598*b*, covering 180 degree with 15 narrow beams over time span 596. The beacon is transmitted for example every 100 msec regularly.

As a consequence of the signal form update, STAs change their discovery signal transmission form 600. Beacon frames 604 are seen with beacon intervals 602*a*, 602*b*. The STA received a command to increase beam width by 3 times that of the original beam width. Thus, the STA is seen adapting to transmit only 5 (one third of 15) beams in each beacon transmission time, covering the same angle coverage, while losing antenna gain from a value $G_n$ to $G_w$. The resultant beam patterns 608*a*, 608*b* are seen over time span 606.

3.9.3. Changing Beam Direction of the Discovery Signal

Figure 29:
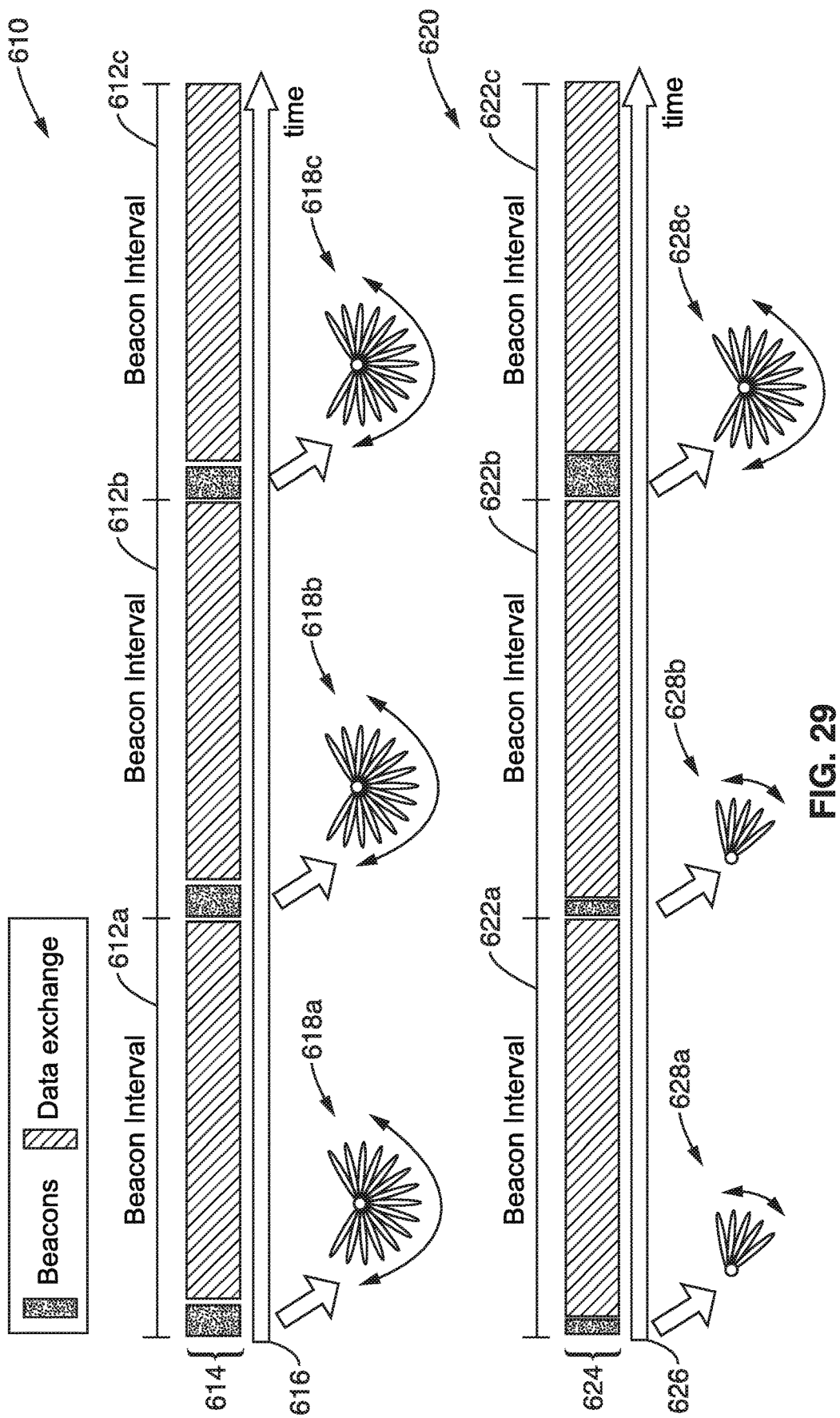
FIG. 29 is a signal form adaptation diagram showing beam direction changes utilized according to an embodiment of the present disclosure.

FIG. 29 illustrates an example embodiment 610, 620 showing a another type of signal transmission form update.

Originally, as was also seen in FIG. 26, the STA is transmitting beacon frames 614 as its discovery signal, depicting beacon intervals 612*a*, 612*b*, and 612*c* over time span 616. These beacon signals covers over 180 degrees with 15 narrow beams, as seen in the patterns 618*a*, 618*b* and 618*c*. The beacon is transmitted every 100 msec regularly.

As a consequence of the signal form update, the affected STAs will change their discovery signal transmission form 620 as shown in the figure. Beacons 624 are shown with beacon intervals 622*a*, 622*b*, and 622*c* over a time span 626. It is assumed in this example, that the STA receives a Notification frame from Central Server to update its signal form, and that the STA receives a Signal Form element containing 2 Beam Spec fields. The first Beam Spec field suggests to decrease angle coverage by ⅓. The second Beam Spec field directs the STA to increase signal transmission interval to 300 msec. According to information in the first Beam Spec field, the STA transmits limited angle coverage with 5 (one third of 15) beams seen as 628*a*, 628*b*. Per information in the second Beam Spec field, the STA transmits beacon frames in the original form (same coverage) but transmitted 628*a* every 300 msec. As a combination of these two directives, the STA transmits discovery signal in irregular form as shown 628*c* in the figure.

3.9.4. Changing Discovery Signal Tx Form by Combo of Commands

It should also be appreciated that the present disclosure contemplates adapting (changing) transmission parameters in any desired form of change, but also in any desired combination of these changes.

Figure 30:
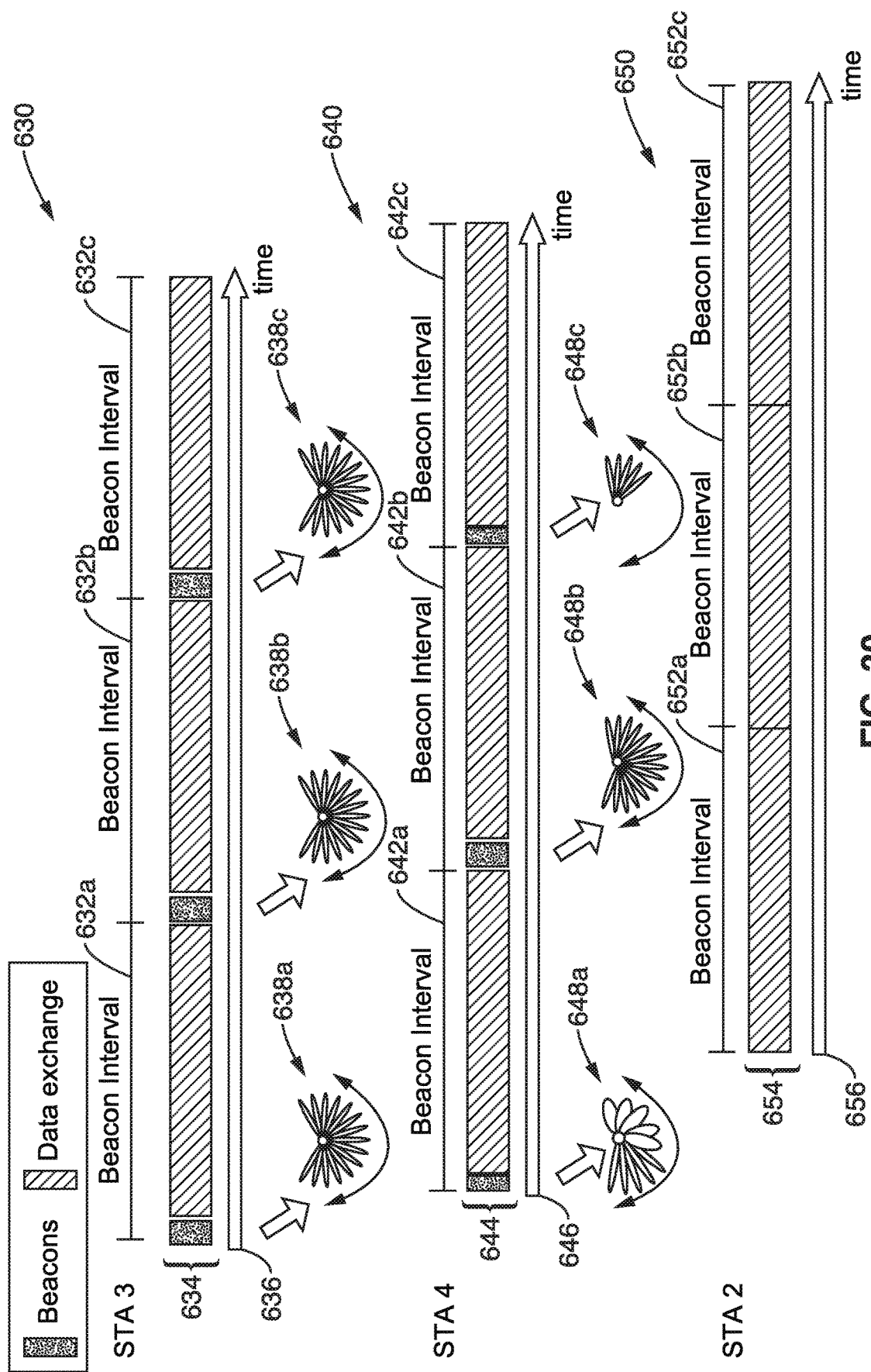
FIG. 30 is a signal form adaptation diagram showing a combination of signal form changes as utilized according to an embodiment of the present disclosure.

FIG. 30 illustrates an example embodiment 630, 640, 650 of the signal transmission form updates that can arise with the deployment scenario shown in FIG. 15. In this example the STAs update their discovery signal transmission forms based on the history of the events.

STA-3 630 is shown with beacons 634 having beacon intervals 632*a*, 632*b*, 632*c* over time span 636, with beam patterns 638*a*, 638*b*, 638*c* which are all the same. Thus, STA-3 does not change its discovery signal transmission form from the original form, and it maintains full angle coverage, without changing beacon interval or beam width.

STA-4 executed a signal form change 640 by either receiving a Notification frame from a Central Server (in case of centralized management procedure) or in response to a decision made by itself (in case of distributed management procedures), and generates an irregular beam pattern changing over time. As discussed in regards to FIG. 29, it is possible that the Central Server can inform STA-4 to update the signal transmission form in irregular manner. STA-4 is seen sending beacons 644 with beacon intervals 642*a*, 642*b* and 642*c* over time span 646, and showing beam patterns

648a, 648b and 648c. It can be seen that the beam widths transmitted 648a are at different widths during the sweep, then at 648b set to a constant narrow beam width, and then at 648c set to ⅓ the sending frequency.

STA-2 is depicted 650, which kept on increasing Signal Intervals, due to the event observed in the past. As a result, it stops transmitting discovery signals. There are no beacons 654 during the beacon intervals 652a, 652b, 652c over time span 656. However, the network learns that there are other STAs in the network nearby STA-2. So, these other STAs perform the discovery process, and STA-2 does not need to keep on transmitting discovery signal unnecessarily.

3.10. Benefits of Signal Adaptation

As a result of the discovery signal adaptation schemes described above, transmission signal forms of the STAs depicted in FIG. 15 were adapted as follows.

STA-1: limited its angle coverage of the discovery signal, as a new STA does not show up from the direction of the walls in its history. Also, it increases beam width of the discovery signal, as the far place from STA-1 is covered by other STAs and STA-1 does not detect a new STA from these areas often. STA-1 also increases its discovery signal transmission interval, as a new STA is not detected often enough.

STA-2: increases its discovery signal transmission interval, as a new STA is not detected often in its history. STA-2 is connected to the Gateway and accommodates active traffic at all times. As a result, STA-2's discovery signal is rarely transmitted and sometimes it does not transmit discovery signals at all.

STA-3: increases beam width as most of the signal strength from the newly detected STA are high level in its history. It also increases its discovery signal transmission interval, as a new STA is not detected often enough. However, it does not change the angle of the coverage, as it detects new STAs from all angles in its history.

STA-4: limits its angle coverage of the discovery signal, as a new STA does not show up from the direction of the walls in its history. It increases beam width of some portion of the directions as new STA's signal strength level detected from the direction was often high enough. It also increases its discovery signal transmission interval, as a new STA is not detected often enough in its history.

STA-5: limits its angle coverage of the discovery signal, as the new STA does not show up from the direction of the walls in its history. It increases beam width of some part of the direction as new STA's signal strength level detected from the direction was often high enough. However, it maintains its discovery signal transmission interval, as STA-5 is located closer to the entrance of the room and it detects a new STA often in its history.

STA-6: limits its angle coverage of the discovery signal, as the new STA does not show up from the direction of the walls in its history. It increases beam width of some part of the direction as new STA's signal strength level detected from the direction was often high enough. However, it maintains its discovery signal transmission interval, as STA-5 is located closer to the entrance of the room and it detected a new STA often in its history.

In this way, discovery signal transmission form is adapted so that the network detects new STAs efficiently without causing much overhead of the discovery signals.

4. Summary of Disclosure Elements

The following is a partial summary of aspects associated with the present disclosure.

Wireless communication system/apparatus with directional transmission performing transmission of signals that aid scanning for network discovery, comprising: (a) STAs collect information on a newly discovered STA and record the event in a data base; (b) the network STAs exchange the data base information with an entity that operates as a central coordinator or other STAs in the network; (c) either network STA or central coordinator determines the signal transmission form based on the information received from network STAs; (d) either network STA or central coordinator transmit the determined signal transmission form to STAs in the network; (e) a network STA receiving the determined signal transmission form adjusts the signal transmission that aid scanning for networks as indicated in the received information.

The wireless communication system/apparatus described above in which the network STA receiving the determined signal transmission form adjust frequency or timing of the signal that aids a new station in scanning for the network.

The wireless communication system/apparatus described above in which the network STA receiving the determined signal transmission form adjusts beam width of the signal that aids a new station in scanning for the network.

The wireless communication system/apparatus described above in which the network STA receiving the determined signal transmission form adjust directionality of the transmitted signal to aid a new station scanning for the network.

The wireless communication system/apparatus as described above, in which the network STAs collect information on antenna sector through which the newly discovered STA is detected.

The wireless communication system/apparatus as described above, where the network STAs collect information on active links together with the newly discovered STA.

The wireless communication system/apparatus as described above, where the network STAs collect information on interference signals together with said newly discovered STA.

5. General Scope of Embodiments

The enhancements described in the presented technology can be readily implemented within various directional wireless stations. It should also be appreciated that wireless station circuits are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in each of the diagrams for the sake of simplicity of illustration, as one of ordinary skill in the art recognizes the use of computer devices for carrying out steps involved with wireless data communication. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, comprising: (a) a wireless communication circuit configured for wirelessly communicating with other wireless communication stations utilizing directional millimeter-wave (mmW) communications having a plurality of antenna pattern sectors each having different transmission directions; (b) a processor coupled to said wireless communication circuit within a station configured for operating on the network; (c) a non-transitory memory storing instructions executable by the processor; and (d) wherein said instructions, when executed by the processor, perform steps comprising: (d)(i) collecting information on a newly discovered station and recording an event within a data base, containing information about the newly discovered station; (d)(ii) exchanging information from said data base with other entities on the network comprising either a central coordinator entity or other stations in the network; (d)(iii) determining a signal transmission form based on information received from a network station; (d)(iv) transmitting the determined signal transmission form to other stations in the network as said wireless communication circuit operates as either a central coordinator or a regular station; and (d)(v) adjusting signal transmissions according to a received determined signal transmission form from other stations or a central controller, toward aiding new stations scanning for the network.

2. The apparatus of any preceding or following embodiment, wherein said instructions when executed by the processor further perform steps comprising adjusting frequency or timing of its transmitted signals, in response to receiving said determined signal transmission form, to aid network scanning by other stations.

3. The apparatus of any preceding or following embodiment, wherein said instructions when executed by the processor further perform steps comprising adjusting beam width of its transmitted signals, in response to receiving said determined signal transmission form, to aid network scanning by other stations.

4. The apparatus of any preceding or following embodiment, wherein said instructions when executed by the processor further perform steps comprising adjusting directionality of its transmitted signals, in response to receiving said determined signal transmission form, to aid network scanning by other stations.

5. The apparatus of any preceding or following embodiment, wherein said instructions when executed by the processor further perform steps comprising collecting information on which antenna sector was used when discovering a new station.

6. The apparatus of any preceding or following embodiment, wherein said instructions when executed by the processor further perform steps comprising collecting information on active links being utilized as information for the event associated with a newly discovered station.

7. The apparatus of any preceding or following embodiment, wherein said instructions when executed by the processor further perform steps comprising collecting information on management signals as information for the event associated with a newly discovered station.

8. The apparatus of any preceding or following embodiment, wherein said instructions when executed by the processor further perform steps of transmitting beacon frames or notification frames that incorporate event information from said data base to perform said exchanging information from said data base.

9. The apparatus of any preceding or following embodiment, wherein said beacon frames or notification frames can incorporate one or more event data elements.

10. The apparatus of any preceding or following embodiment, wherein each said event data element comprises an element identification, length, station identification, type of event, time stamp, data for the event and status for the data base.

11. An apparatus for wireless communication in a network, comprising: (a) a wireless communication circuit configured for wirelessly communicating with other wireless communication stations utilizing directional millimeter-wave (mmW) communications having a plurality of antenna pattern sectors each having different transmission directions; (b) a processor coupled to said wireless communication circuit within a station configured for operating on the network; (c) a non-transitory memory storing instructions executable by the processor; and (d) wherein said instructions, when executed by the processor, perform steps comprising: (d)(i) collecting information on a newly discovered station and recording an event, associated with the newly discovered station, in a data base; (d)(ii) exchanging information from said data base with other station entities on the network comprising either a central coordinator entity or other stations in the network; (d)(iii) determining a signal transmission form based on information received from a network station; (d)(iv) transmitting the determined signal transmission form to stations in the network as said wireless communication circuit operates as either a central coordinator or a regular station; and (d)(v) adjusting signal transmission, as directed in a signal transmission form as received from other stations or a central controller, toward aiding new stations scanning for the network; (d)(vi) wherein one or more of said signal transmission adjustments is selected from a group of transmission forms consisting of adjusting frequency or timing of transmitted signals, adjusting beam width of transmitted signals, and adjusting directionality of transmitted signals.

12. The apparatus of any preceding or following embodiment, wherein said instructions when executed by the processor further perform steps comprising collecting information on which antenna sector was used discovering a new station.

13. The apparatus of any preceding or following embodiment, wherein said instructions when executed by the processor further perform steps comprising collecting information on active links being utilized as information for the event to be utilized together with information about a newly discovered station.

14. The apparatus of any preceding or following embodiment, wherein said instructions when executed by the processor further perform steps comprising collecting information on management signals as information for the event to be utilized together with information about a newly discovered station.

15. The apparatus of any preceding or following embodiment, wherein said instructions when executed by the processor further perform steps of transmitting beacon frames or notification frames that incorporate event information from said data base to perform said exchanging information from said data base.

16. The apparatus of any preceding or following embodiment, wherein said beacon frames or notification frames can incorporate one or more event data elements.

17. The apparatus of any preceding or following embodiment, wherein each said event data element comprises an element identification, length, station identification, type of event, time stamp, data for the event and status for the data base.

18. A method for performing wireless communication in a network, comprising: (a) wirelessly communicating, from a wireless communication circuit to other wireless communication stations, utilizing directional millimeter-wave (mmW) communications from a plurality of antenna pattern sectors each having different transmission directions; (b) collecting information on a newly discovered station by programming executing on the wireless communication circuit, information about said newly discovered station is recorded in a data base as an event associated with the newly discovered station; (c) exchanging information from said data base with other entities on the network comprising either a central coordinator entity or other stations in the network; (d) determining a signal transmission form based on information received from another network station; (e) transmitting the determined signal transmission form to stations in the network as said wireless communication circuit operates as either a central coordinator or a regular station; and (f) adjusting signal transmission, as indicated in a determined signal transmission form as received from other stations or a central controller, to aid new stations scanning for the network.

19. The method of any preceding or following embodiment, wherein one or more of said signal transmission adjustments is selected from a group of transmission forms consisting of adjusting frequency or timing of its transmitted signals, adjusting beam width of its transmitted signals, and adjusting directionality of its transmitted signals.

20. The method of any preceding or following embodiment, further comprising: (a) collecting one or more elements of network information as selected from a group of network communication event information consisting of antenna sector used when discovering a new station, active links being utilized when a new station is discovered, and detected management signals; and (b) incorporating event information from said data base into beacon frame and/or notification frame transmissions to exchange information from said data base.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
    (a) a wireless communication circuit configured for wirelessly communicating with other wireless communication stations utilizing directional millimeter-wave (mmW) communications having a plurality of antenna pattern sectors each having different transmission directions;
    (b) a processor coupled to said wireless communication circuit within a station configured for operating on the network;
    (c) a non-transitory memory storing instructions executable by the processor; and
    (d) wherein said instructions, when executed by the processor, perform steps comprising:
        (i) collecting information on a newly discovered station and recording an event within a data base, said data base containing information about the newly discovered station;
        (ii) exchanging information from said data base with other entities on the network comprising either a central coordinator entity or other stations on the network;
        (iii) determining a signal transmission form based on information received from a network station;
        (iv) transmitting the determined signal transmission form to other stations on the network as said wireless communication circuit operates as either a central coordinator or a regular station; and
        (v) adjusting signal transmissions according to a received determined signal transmission form from other stations or a central controller, toward aiding new stations scanning for the network.

2. The apparatus as recited in claim 1, wherein said instructions when executed by the processor further perform steps comprising adjusting frequency or timing of its transmitted signals, in response to receiving said determined signal transmission form, to aid network scanning by other stations.

3. The apparatus as recited in claim 1, wherein said instructions when executed by the processor further perform steps comprising adjusting beam width of its transmitted signals, in response to receiving said determined signal transmission form, to aid network scanning by other stations.

4. The apparatus as recited in claim 1, wherein said instructions when executed by the processor further perform steps comprising adjusting directionality of its transmitted signals, in response to receiving said determined signal transmission form, to aid network scanning by other stations.

5. The apparatus as recited in claim 1, wherein said instructions when executed by the processor further perform steps comprising collecting information on which antenna sector was used when discovering a new station.

6. The apparatus as recited in claim 1, wherein said instructions when executed by the processor further perform steps comprising collecting information on active links being utilized as information for the event associated with a newly discovered station.

7. The apparatus as recited in claim 1, wherein said instructions when executed by the processor further perform steps comprising collecting information on management signals as information for the event associated with a newly discovered station.

8. The apparatus as recited in claim 1, wherein said instructions when executed by the processor further perform steps of transmitting beacon frames or notification frames that incorporate event information from said data base to perform said exchanging information from said data base.

9. The apparatus as recited in claim 8, wherein said beacon frames or notification frames can incorporate one or more event data elements.

10. The apparatus as recited in claim 9, wherein each said event data element comprises an element identification, length, station identification, type of event, time stamp, data for the event and status for the data base.

11. An apparatus for wireless communication in a network, comprising:
    (a) a wireless communication circuit configured for wirelessly communicating with other wireless communication stations utilizing directional millimeter-wave (mmW) communications having a plurality of antenna pattern sectors each having different transmission directions;
    (b) a processor coupled to said wireless communication circuit within a station configured for operating on the network;
    (c) a non-transitory memory storing instructions executable by the processor; and
    (d) wherein said instructions, when executed by the processor, perform steps comprising:

(i) collecting information on a newly discovered station and recording an event, associated with the newly discovered station, in a data base;

(ii) exchanging information from said data base with other station entities on the network comprising either a central coordinator entity or other stations on the network;

(iii) determining a signal transmission form based on information received from a network station;

(iv) transmitting the determined signal transmission form to stations on the network as said wireless communication circuit operates as either a central coordinator or a regular station; and (v) adjusting signal transmission, as directed in a signal transmission form as received from other stations or a central controller, toward aiding new stations scanning for the network;

(vi) wherein one or more of said signal transmission adjustments is selected from a group of transmission forms consisting of adjusting frequency or timing of transmitted signals, adjusting beam width of transmitted signals, and adjusting directionality of transmitted signals.

12. The apparatus as recited in claim 11, wherein said instructions when executed by the processor further perform steps comprising collecting information on which antenna sector was used discovering a new station.

13. The apparatus as recited in claim 11, wherein said instructions when executed by the processor further perform steps comprising collecting information on active links being utilized as information for the event to be utilized together with information about a newly discovered station.

14. The apparatus as recited in claim 11, wherein said instructions when executed by the processor further perform steps comprising collecting information on management signals as information for the event to be utilized together with information about a newly discovered station.

15. The apparatus as recited in claim 11, wherein said instructions when executed by the processor further perform steps of transmitting beacon frames or notification frames that incorporate event information from said data base to perform said exchanging information from said data base.

16. The apparatus as recited in claim 15, wherein said beacon frames or notification frames can incorporate one or more event data elements.

17. The apparatus as recited in claim 16, wherein each said event data element comprises an element identification, length, station identification, type of event, time stamp, data for the event and status for the data base.

18. A method for performing wireless communication in a network, comprising:

(a) wirelessly communicating, from a wireless communication circuit to other wireless communication stations, utilizing directional millimeter-wave (mmW) communications from a plurality of antenna pattern sectors each having different transmission directions;

(b) collecting information on a newly discovered station by programming executing on the wireless communication circuit, information about said newly discovered station is recorded in a data base as an event associated with the newly discovered station;

(c) exchanging information from said data base with other entities on the network comprising either a central coordinator entity or other stations on the network;

(d) determining a signal transmission form based on information received from another network station;

(e) transmitting the determined signal transmission form to stations on the network as said wireless communication circuit operates as either a central coordinator or a regular station; and (f) adjusting signal transmission, as indicated in a determined signal transmission form as received from other stations or a central controller, to aid new stations scanning for the network.

19. The method as recited in claim 18, wherein one or more of said signal transmission adjustments is selected from a group of transmission forms consisting of adjusting frequency or timing of its transmitted signals, adjusting beam width of its transmitted signals, and adjusting directionality of its transmitted signals.

20. The method as recited in claim 18, further comprising:

(a) collecting one or more elements of network information as selected from a group of network communication event information consisting of antenna sector used when discovering a new station, active links being utilized when a new station is discovered, and detected management signals; and (b) incorporating event information from said data base into beacon frame and/or notification frame transmissions to exchange information from said data base.

\* \* \* \* \*